United States Patent
Haitsuka et al.

(10) Patent No.: US 11,392,637 B2
(45) Date of Patent: Jul. 19, 2022

(54) SYSTEMS AND METHODS FOR CONTENT METADATA MANAGEMENT

(71) Applicant: TUNEGO, INC., Henderson, NV (US)

(72) Inventors: Stacy Haitsuka, Henderson, NV (US); John Kohl, Henderson, NV (US); Ofek Hayon, Henderson, NV (US); Mark Goldston, Henderson, NV (US)

(73) Assignee: TUNEGO, INC., Henderson, NV (US)

( * ) Notice: Subject to any disclaimer, the term of this patent is extended or adjusted under 35 U.S.C. 154(b) by 70 days.

(21) Appl. No.: 16/601,886

(22) Filed: Oct. 15, 2019

(65) Prior Publication Data

US 2021/0011946 A1  Jan. 14, 2021

Related U.S. Application Data

(60) Provisional application No. 62/872,348, filed on Jul. 10, 2019.

(51) Int. Cl.
*G06F 16/00* (2019.01)
*G06F 16/61* (2019.01)
*G06F 16/68* (2019.01)

(52) U.S. Cl.
CPC ............ *G06F 16/61* (2019.01); *G06F 16/686* (2019.01)

(58) Field of Classification Search
CPC ........ G06F 16/61; G06F 16/686; G06F 21/10; H04N 21/8355; H04N 21/84
See application file for complete search history.

(56) References Cited

U.S. PATENT DOCUMENTS

| | | | |
|---|---|---|---|
| 7,920,528 B2 | 4/2011 | Karaguz et al. | |
| 8,312,064 B1 * | 11/2012 | Gauvin | G06F 21/6218 707/822 |
| 9,397,998 B2 | 7/2016 | Ford et al. | |
| 10,819,507 B2 | 10/2020 | Shi et al. | |

(Continued)

FOREIGN PATENT DOCUMENTS

| | | |
|---|---|---|
| JP | 2012521036 | 9/2012 |
| JP | 2014010343 | 1/2014 |

(Continued)

OTHER PUBLICATIONS

Deahl, Dani. "Metadata Is the Biggest Little Problem Plaguing the Music Industry." The Verge, The Verge, May 29, 2019, www.theverge.com/2019/5/29/18531476/music-industry-song-royalties-metadata-credit-problems. (Year: 2019).*

(Continued)

*Primary Examiner* — Syed H Hasan
(74) *Attorney, Agent, or Firm* — Sheppard, Mullin, Richter & Hampton LLP

(57) ABSTRACT

A system and method for content management, may include receiving content created by a creator; creating a container to contain the created content and storing the created content in the container; determining a content type for the content; based on the determined content type, identifying items of metadata specified for the content type (name metadata; support data; corresponding; determining whether an identified item of specified metadata corresponding to the content is missing from the container; and prompting a user to supply identified missing metadata corresponding to the container.

20 Claims, 17 Drawing Sheets

(56) References Cited

U.S. PATENT DOCUMENTS

| | | | |
|---|---|---|---|
| 2002/0002468 A1* | 1/2002 | Spagna | H04W 4/02 |
| | | | 713/193 |
| 2002/0099694 A1* | 7/2002 | Diamond | G06F 16/4387 |
| 2003/0220894 A1* | 11/2003 | Russon | G06F 16/58 |
| 2004/0267390 A1* | 12/2004 | Ben-Yaacov | G06F 16/68 |
| | | | 700/94 |
| 2005/0038813 A1 | 2/2005 | Apparao et al. | |
| 2005/0055372 A1* | 3/2005 | Springer, Jr. | G06F 16/907 |
| 2006/0229993 A1 | 10/2006 | Cole | |
| 2007/0027707 A1 | 2/2007 | Murray et al. | |
| 2007/0283167 A1 | 12/2007 | Venters, III et al. | |
| 2008/0065547 A1 | 3/2008 | Shimizu | |
| 2008/0126937 A1* | 5/2008 | Pachet | G06F 3/017 |
| | | | 715/720 |
| 2008/0318669 A1 | 12/2008 | Buchholz | |
| 2009/0282093 A1 | 11/2009 | Allard et al. | |
| 2009/0307201 A1* | 12/2009 | Dunning | G06F 16/683 |
| 2010/0017395 A1* | 1/2010 | Wayn | G06F 16/24 |
| | | | 707/E17.014 |
| 2010/0030607 A1* | 2/2010 | Holcombe | G06Q 30/06 |
| | | | 705/59 |
| 2010/0046553 A1 | 2/2010 | Daigle et al. | |
| 2011/0083085 A1 | 4/2011 | Steelberg | |
| 2011/0125999 A1* | 5/2011 | Cilfone | G06F 3/065 |
| | | | 713/150 |
| 2011/0188718 A1* | 8/2011 | Hill | G16H 30/20 |
| | | | 382/128 |
| 2011/0208616 A1 | 8/2011 | Gorman et al. | |
| 2011/0218983 A1* | 9/2011 | Chaney | G06F 16/686 |
| | | | 707/705 |
| 2012/0150997 A1 | 6/2012 | McClements, IV | |
| 2012/0158802 A1 | 6/2012 | Lakshmanan et al. | |
| 2013/0263184 A1 | 10/2013 | Melnychenko et al. | |
| 2014/0040216 A1 | 2/2014 | Thomas | |
| 2014/0289516 A1 | 9/2014 | Sahay | |
| 2014/0359465 A1 | 12/2014 | Litan Sever et al. | |
| 2015/0177938 A1 | 6/2015 | Kleinpeter et al. | |
| 2015/0188975 A1 | 7/2015 | Hansen et al. | |
| 2015/0207786 A1 | 7/2015 | Pitroda | |
| 2015/0235276 A1 | 8/2015 | Wilson | |
| 2016/0005135 A1 | 1/2016 | Bokestad | |
| 2016/0098393 A1 | 4/2016 | Herbert | |
| 2016/0275194 A1 | 9/2016 | Borza et al. | |
| 2016/0352523 A1 | 12/2016 | Bisbee et al. | |
| 2017/0024399 A1 | 1/2017 | Boyle et al. | |
| 2017/0140743 A1 | 5/2017 | Gouyon et al. | |
| 2020/0005284 A1 | 1/2020 | Vijayan | |

FOREIGN PATENT DOCUMENTS

| | | |
|---|---|---|
| JP | 2015021987 | 2/2015 |
| KR | 10-2008-0081954 | 9/2008 |

OTHER PUBLICATIONS

The role of metadata in music. iMusician. (Apr. 30, 2014). Retrieved Mar. 10, 2022, from https://imusician.pro/en/resources/blog/metadata-label-copy (Year: 2014).*

The Spotify Community, "How long do you have to listen for a song to count as "played"?", Message board between Nov. 11, 2014 and Jan. 4, 2017, https://community.spotify.com/t5/forums/replypage/board-id/002/message-id/14842, last accessed Jan. 5, 2017, 8 total pages.

Stinson, Jamie, "Spotify drops five-plays-per-song limit for free users," MSE News article, published Mar. 19, 2013, http://moneysavingexpert.com/new/shopping/2013/03/spotify-drops-five-play-per-song-limit-for-free-users?_ga=1.81803094.1534910942.1487007596, 2 total pages.

European Union Intellectual Property Office, European Search Report and Written Opinion for European Application No. EP18208302, dated Feb. 15, 2019, 10 total pages.

Japan Intellectual Property Office, Notice for Reasons for Rejection for Japanese Application No. 2018-216844, dated Jan. 29, 2019, 4 total pages with English translation.

Non-final Office Action dated Jan. 31, 2020 for U.S. Appl. No. 16/681,598, filed Nov. 12, 2019.

International Search Report and Written Opinion dated Oct. 13, 2020 for International Application No. PCT/US2020/041567, filed Jul. 10, 2020.

International Search Report and Written Opinion dated Jan. 4, 2021 for International Application No. PCT/US2020/059863, filed Nov. 10, 2020.

Non-final Office Action dated Jun. 24, 2021 for U.S. Appl. No. 17/221,723, filed Apr. 2, 2021.

Ex Parte Quayle Office Action dated Jul. 9, 2021 for U.S. Appl. No. 17/240,928, filed Apr. 26, 2021.

Non-final Office Action dated Sep. 14, 2021 for U.S. Appl. No. 17/221,723.

Final Office Action dated Feb. 18, 2022 for U.S. Appl. No. 17/221,723, filed Apr. 2, 2021.

* cited by examiner

SYSTEMS AND METHODS FOR CONTENT METADATA MANAGEMENT

CROSS-REFERENCE TO RELATED APPLICATIONS

This application claims priority to U.S. Provisional Patent Application No. 62/872,348 filed Jul. 10, 2019, and titled "SYSTEMS AND METHODS FOR CONTENT METADATA MANAGEMENT," which is incorporated herein by reference in its entirety.

TECHNICAL FIELD

The disclosed technology relates generally to media content files, and more particularly, some embodiments relate to containers for audio content and associated metadata.

DESCRIPTION OF THE RELATED ART

The recording industry has struggled for many years with problems associated with keeping track of records associated with audio recordings. Record labels, licensing companies, publishers and other industry participants have been known to spend months, and sometimes years, tracking down music rights information and other records associated with audio recordings. Also, the industry in general and the artist themselves have often struggled with keeping track of who contributed to the creation of a song or who should otherwise have certain rights. These issues are not limited to audio recordings and can span other media content as well.

The foregoing issues can lead to difficulties when licensing content for use by third parties, difficulties recognizing and compensating artists for their contribution to content, difficulties with version control for content items, and difficulties keeping track of pertinent content information in general.

The media content industry has yet to arrive at an acceptable solution, leading to critical data being lost or untraceable and in some cases the loss of rights. Current manual techniques for addressing metadata have proven unsuccessful as oftentimes metadata is either lost or incomplete, or not collected in the first place. Participants such as content creators and publishers are also often unaware of the types of information that needs to be collected and maintained along with their content. Accordingly, much time is often spent after the fact attempting to locate and gather this information. In some instances, the information is no longer available due to the amount of time that has passed.

BRIEF SUMMARY OF EMBODIMENTS

According to various embodiments of the disclosed technology, systems and methods may be implemented to create, manage and share one or more content items, along with metadata or other related files associated with those content items such as, for example, in a portable physical file that can be exported. The system may be implemented to create a container to contain one or more content items and associated metadata. The system may be further implemented to verify the completeness of metadata files associated with content items in the containers, alert appropriate users if specified metadata files are missing from a container, and allow users to update the metadata to complete the containers.

Some or all of the metadata information pertaining to a song/single, EP or album (or other content) can be shared, copied or transferred by generating a container file that includes the media file (e.g., audio/video), metadata and all other related assets encapsulated in one secure file. Information and assets may be stored either directly in the file or using an identifier or link that identifies the data stored on a server. Information and assets can also be viewed and managed either through a web portal and application utilizing a network connection to a server, or via native application on a user device that will access and update the data stored in the file or a combination of both.

Various embodiments can be implemented to address problems in the media content industry such as keeping track of records regarding items such as, for example, creators and co-collaborators, performers and other artists, media rights information, version control, copyright information, recognition of rights information, and so on. Embodiments may be implemented to effectively track all who contributed to an item of media content and capture the nature of their contribution. This can help to avoid issues with recognizing the wrong individuals or failing to recognize actual contributors. Embodiments provide systems and methods to solve problems in the industry that have yet to be solved and to accomplish this using novel processes for receipt, management, sharing and tracking of media content items and their associated metadata including, for example, novel files and file structures, novel data capture and storage techniques, novel metadata checking, and so on.

A method for content management may include: receiving content created by a creator; creating a container to contain the created content and storing the created content in the container; determining a content type for the content; based on the determined content type, identifying items of metadata specified for the content type (name metadata; support data; corresponding; determining whether an identified item of specified metadata corresponding to the content may be missing from the container; and prompting a user to supply identified missing metadata corresponding to the container. The method may further include informing the creator that the container may be complete.

The method may further include: receiving metadata corresponding to the content from a custodian of the container; and adding the received metadata to the container. In some embodiments, when all items of metadata specified for the content are in the container, marking the container as complete. Multiple levels of completeness may be defined for the container, and marking the container as complete may include marking the container as complete for a given level of completeness based on the content items included in the container. Adding the received metadata to the container may include storing the metadata in the container or storing a link to the metadata in the container.

The method may further include periodically checking the container to determine whether an identified item of specified metadata corresponding to the content may be in the container. The content may be a standard audio file and the method may further include appending the metadata to the standard audio file and maintaining backward compatibility with existing audio players.

The method may further include checking the received metadata to confirm that the received metadata corresponds to a type of identified item of specified metadata corresponding to the content.

The method may further include: receiving a request by a custodian of the content to share the container with an intended recipient; and transferring the container to an intended recipient. The method may track access information comprising an identity of a person who accessed the container.

In various embodiments a content management system may include: a processor; and a memory coupled to the processor to store instructions, which when executed by the processor, cause the processor to perform operations, the operations comprising: receiving content created by a creator; creating a container to contain the created content and storing the created content in the container; determining a content type for the content; based on the determined content type, identifying items of metadata specified for the content type (name metadata; support data; corresponding; determining whether an identified item of specified metadata corresponding to the content may be missing from the container; and prompting a user to supply identified missing metadata corresponding to the container.

The system may further include: receiving metadata corresponding to the content from a custodian of the container; and adding the received metadata to the container. The system may further include, when all items of metadata specified for the content are in the container, marking the container as complete. Multiple levels of completeness may be defined for the container, and marking the container as complete may include marking the container as complete for a given level of completeness based on the content items included in the container.

The system may further include periodically checking the container to determine whether an identified item of specified metadata corresponding to the content may be in the container.

Adding the received metadata to the container may include storing the metadata in the container or storing a link to the metadata in the container.

The system may further include checking the received metadata to confirm that the received metadata corresponds to a type of identified item of specified metadata corresponding to the content.

The system may further include: receiving a request by a custodian of the content to share the container with an intended recipient; and transferring the container to an intended recipient.

The system may further include tracking access information comprising an identity of a person who accessed the container Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
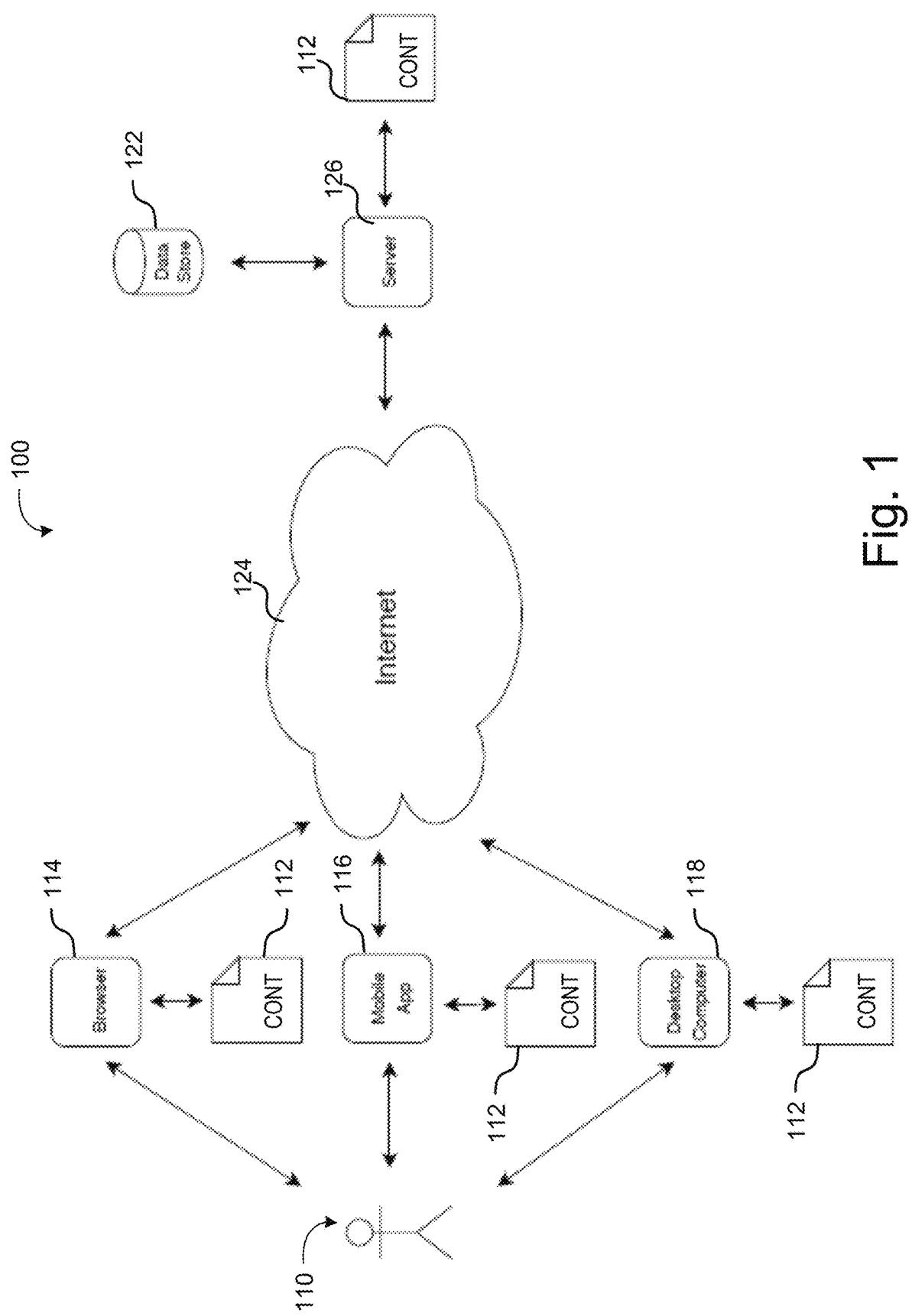
FIG. 1 illustrates an example container-based content management system in accordance with one embodiment.

The figures are not exhaustive and do not limit the disclosure or the disclosed embodiments to the precise form disclosed.

DETAILED DESCRIPTION OF THE EMBODIMENTS

According to various embodiments of the disclosed technology, systems and methods may be implemented to create, manage and share one or more content items, along with metadata or other related files associated with those content items such as, for example, in a portable physical file that can be exported. The content items may include, for example, recorded audio files, video files, images, or other electronically capturable or storable content. The file, or container, in which a content item and its associated files are kept may be maintained, for example, as a portable, physical file (e.g., on a flash drive, on a disk, or as a file in memory or on disk on a server or other computing system) that the owner can share with others.

The information stored in the container may be one or more content items of various types and related files themselves, it may be in the form of links to the data or files stored elsewhere, it may be a link to third party data or services, or it may be a combination of the foregoing. Third party data and services might include, for example, the IRS, streaming services (e.g., Spotify, Pandora, etc.), Performance Rights Organizations (PROs), Soundexchange, the Copyright Office, or other third party resources. The container can be secured such as, for example, by encrypting the files stored on the container or otherwise using access-control techniques to keep the file and its contents from being accessed by unintended recipients.

Embodiments also provide an interface for the user to view, play or edit the data within the container. For example, a UI can allow a custodian of the container (e.g., the author(s) of the content, publisher, recipient with designated permissions, or other recognized user to provide an updated content file, access and play back the content file, modify the content file, add or remove the associated files or other metadata and otherwise edit the associated files or other metadata. Embodiments may also be implemented to track and validate any changes made to the container or the data contained therein.

The content management system may be implemented as separate components or as an integrated system, with all components in one location or application. A content or asset creation and management platform can be used to facilitate creation of the content and management of the created content. This can be an application that may be downloaded to or downloadable by users to run on their own devices, or it may be an application supported by a cloud-based platform. A content editor allowing operation such as viewing content, reading content, editing content and so on may also be provided as a downloadable app or as an app presented by a cloud-based solution. This can include one or more components (or other apps) for file reading, content viewing/playing, content editing, and so on. A content or asset sharing application can be used to allow the asset to be shared in a secure and controlled manner. For example, a transportable container can be provided to contain the content and associated metadata, and the container may be secured to allow content items to be transported to other users. As noted above, the container may include the files themselves, links to the files, or a combination of the foregoing.

The container may be securely stored locally, on a portable storage device, or on a cloud-based storage device. The content management system may maintain pointers to file location so that all local updates can be populated to files on a cloud server as well.

Controls may be implemented to allow only owners or admins to make changes to the container items to help maintain integrity of the data. A mechanism can be provided such that if a user doesn't have permission to make changes, they can enter their suggested changes into the system. The system can then send a notification of the change request to the proper users who will view and approve or disapprove the requested changes. Access and modification activities may be tracked along with notifications being sent (based on notification settings). Where multiple approvals are required, for approval may be based on various rules such as majority required, unanimous consent required, and so on.

Before describing example embodiments in detail, it is useful to describe an example high-level overview of a content container system and method. FIG. 1 illustrates an example container-based content management system in accordance with one embodiment. In this example of a container-based content management system 110, a content creator creates media content for publication. Creators can include, for example, writers, performers, arrangers and so on. The media content can include, for example, audio content, video content, image content, written works, multimedia content, and so on. Content management 110 may provide one or more of a plurality of vehicles by which content creators may store their completed or in process works in a container file 112 that includes a metadata file associated with the works. The metadata file in container 112 can include the metadata itself, links to locations where the metadata is stored, or a combination of the foregoing.

In this example, applications such as a browser application 114 (e.g., in a web-based application), a mobile app 116 (e.g., such as may be made available on a smart phone, tablet, or other portable device), and a desktop application 118 (e.g., such as may be made available on a desktop computer, server, laptop computer, or other computing device) may be used by the creators 110 to store their content in a container 112. These applications 114, 116 and 118, and other applications may be used by creators 110 to create content, review content, modify content and share content that they created. The data in container 112 may be encrypted or compressed, stored using a markup language such as JSON or XML, or a combination of the foregoing.

The files in the container or the container itself may be stored, retrieved and updated locally by access to a local copy associated with the user's device. Additionally, the files in the container or the container itself may be stored, retrieved and updated via a network connection to a server 126 that stores and accesses the files on storage device 122. Accordingly, the creation portion of the system can be connected to data store 122, which is preferably a secure data storage environment at which multiple containers 112 may be stored for access by creators and entities with whom which creators wish to share their content. One example of a secure data store 122 is the digital vault for content owners disclosed by U.S. Pat. No. 9,836,619, which is hereby incorporated by reference herein in its entirety.

Local applications or other portals can be provided to allow creators or other custodians to manage, play and update the content and data. In this example, the content management applications 114, 116, 118 access data store 122 and it server 126 via the Internet 124. In other examples, a data storage unit such as data store 122 can be a local data storage unit such as, for example, a disk drive on the creator's computer or other storage unit accessible over a LAN or other available network, a flash drive (e.g., thumb drive, jump drive, etc.) or other local storage unit. In further examples, a data storage unit such as data store 122 can be a remote storage unit accessible by means other than the Internet such as, for example, a WAN or other wired or wireless communications interface. As this example also illustrates, a stored container file 112 can be shared by server 126 with third parties at the direction of the creators or other authorized personnel.

Figure 2:
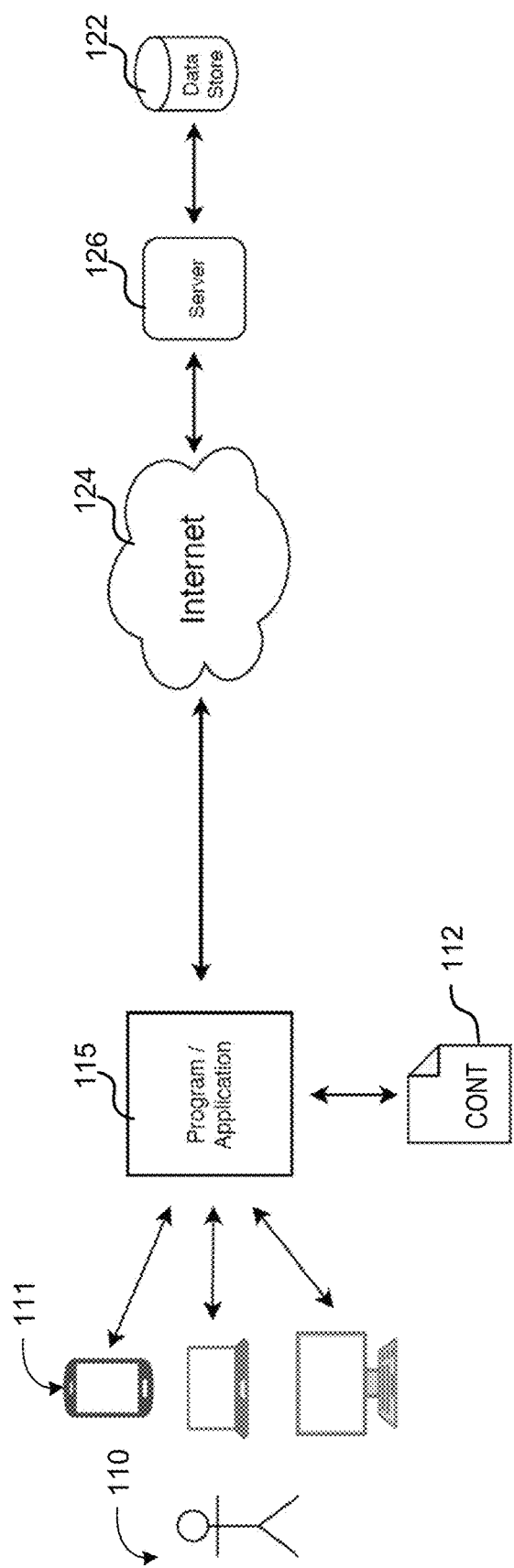
FIG. 2 illustrates a high level example of a creator accessing a content management system to create and store a container file in accordance with one embodiment.

FIG. 2 illustrates a high level example of a creator accessing a content management system to create and store a container file in accordance with one embodiment. With reference now to FIG. 2, in this example creator 110 accesses a content management application 115 (e.g., application 114, 116, 118) on a user device 111 (e.g., smart phone, tablet, laptop, desktop computer, server, rig, etc.) to create a container file 112. Container file 112 can be stored locally or remotely. This example, similar to the example of FIG. 1, illustrates application 115 accessing a server 126 and data store 122 by a communications interface such as the Internet 124.

Figure 3:
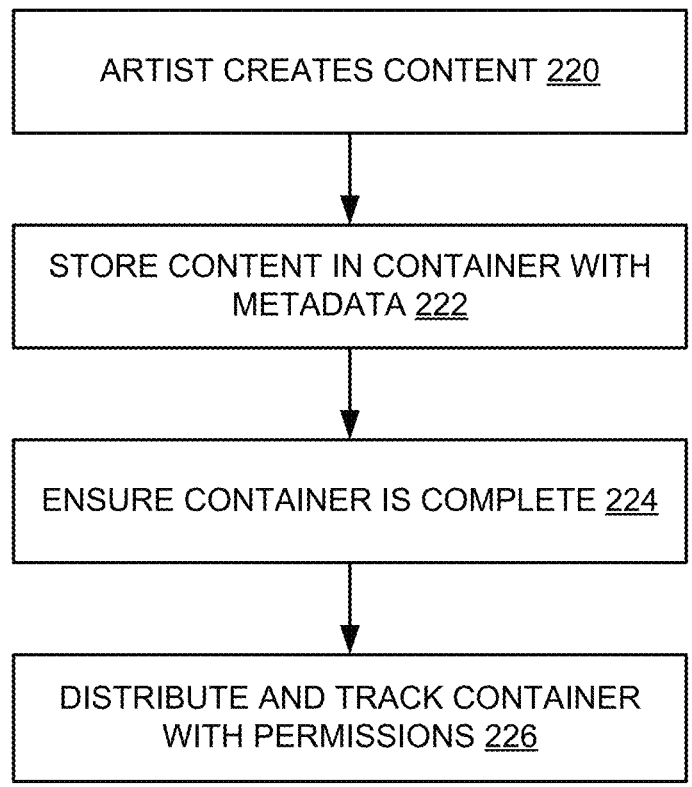
FIG. 3 illustrates an example process for content management using a container file in accordance with one embodiment.

FIG. 3 illustrates an example process for content management using a container file in accordance with one embodiment. In this example, an artist, or a plurality of artists in collaboration, create content at operation 220. As noted above, the content created can be any of a number of different forms of media (including multimedia) content such as audio, video, and so on. The created content can include a completed piece of content or it can be content that is still a work in progress. For example, the created content can be partially completed elements of a song, video production, or other media content that a collaborator or co-collaborators are working on but have not yet finished. As another example, the created content can be a completed song, video production or other media content that the collaborator or collaborators have completed.

At operation 222, the creators store the created content in a container file. The creators also store metadata associated with the content in the container file. In some circumstances, at least some of the metadata might be stored prior to storage or creation of the content. In other circumstances, at least some of the metadata might be stored when the creators store the content. In yet other circumstances, at least some of the metadata might be stored after the content is created and stored. Because the system can store content and metadata for works in progress as well as completed works, the system can allow receipt, management, sharing and tracking of content during the creation process as well as after the creation is complete. Where one or more users store content elements for a given created content in the system, the system can be configured to flag each of those users as potential co-collaborators for that given created content. Accordingly, the system can automatically gather metadata even during the creation process.

At operation 224, the content management system checks the container to ensure that it is complete. Particularly, the system can check to determine that the appropriate items of metadata are included, depending on the type of content stored. For example, different types of metadata may be specified for different types of content. Examples of metadata that might be stored in the container file for audio content are listed in Table 1.

TABLE 1

METADATA EXAMPLES

CREATOR IDENTIFICATION
OWNERSHIP INFORMATION
ROYALTY PAYMENT INFORMATION
DIGITAL DISTRIBUTION RELEASE METADATA AND FILES
LYRICS
SHEET MUSIC
COPYRIGHTS
AGREEMENTS
ALBUM ARTWORK
WORK FOR HIRE CONTRACTS
PERFORMER AND COMPOSER INFORMATION
OTHER METADATA

Checks to ensure that the container is complete with the appropriate forms of metadata can be done at different times. For example, the system may check to ensure that the container is complete when the content is first stored in the container, periodically after the container is created or in response to a user query. In some instances, the container can be configured to check certain of the content items for compliance with the requirements such as, for example, ensuring that an ISBN number is numeric and that it contains 13 digits. As another example, the system can check file types to ensure the correct file type is logged for the metadata it is purported to represent. For instance, the system might be configured to check to ensure that data stored as Album Artwork is a .jpg, .tiff, .gif or other appropriate file type. In further embodiments, the system may be configured to inspect files for content to ensure files are of the appropriate type for the metadata they are purported to represent. In this manner, the system may be programmed to scan purported contracts to determine whether certain language is present confirming it is at least the appropriate document type. This may be based on programming instructions to search for certain text strings, or on an AI trained model employed to predict document types based on content.

As these examples illustrate, when checking for completeness of the metadata, the content management system may be able to check whether certain metadata items are present, but may not be able to verify the accuracy or comprehensiveness of each item. For example, while the system might check to confirm that one or more creators are identified, the system may not know whether all creators have been identified. In some embodiments, the system can send reminders not only for metadata items that appear to be incomplete, but also to remind users to verify that metadata items that appear to be complete are in fact complete and accurate. For example, the system can generate and send a message to the original creators and query them to ensure that no co-collaborators have been left off of the information collected. Because this can be done somewhat contemporaneously with the creation of the content, or at least with the deposit of the content into the container, this information can be gathered while collaborators are still around and recollections of collaborators and their relevant contributions are likely to be fresh and accurate.

Additionally, there may be different levels of completeness for container files. For example, in some applications a first level of completeness (e.g., Level I) the indicated container is ready for distribution to certain recipients or types of recipients, but that it is not ready for other distribution. For example, Level I may mean complete for purposes of distribution to producers or publishers for review, but not yet ready for production. As another example, Level I may mean that the container is complete for distribution to certain streaming services, but not for other streaming services. Continue with these examples, Level II may indicate completeness for all streaming services whereas Level III may be required for certain licensing activities, and so on. As these examples indicate, different levels can be custom defined for various containers or for different content types and the system can be configured to check for levels of completeness.

Where the container appears complete, the system can set a flag or other indicator indicating that it is complete. Where the container is incomplete, the system may set a different flag on the container, indicating that materials are missing. The flag may be in various forms such as a change in the file name, a change in the file extension, an indicator or other alert associated with the container, data in a designated field in the container, or other designation that may indicate the completeness status of the metadata. The system may also be configured to send an alert to the creators or other users indicating that the metadata does not appear to be complete or cast them to verify the completeness of metadata that does appear to be complete. For example, the system may send a message to a user stating that the container is not complete. This message may further include a list of the metadata that is missing or a list of errors that appear to have been found in the metadata (e.g., wrong file type). This information may also be stored in a determined location in the container file itself, so others accessing the file may view this information as well. In yet further embodiments, the system may track container status as a central function such as, for example, by maintaining a log of containers and their statuses at a central or other accessible location or locations. As another example, the system may send a message to a user stating that a metadata element appears to be complete but asking the user to verify accuracy and completeness of the information.

As another example, where the system automatically created metadata not input by the users (e.g., identified users uploading content as collaborators), the system may be configured to generate and send a message to provide this gathered metadata to one or more users asking the one or more users to verify that the automatically created and stored metadata is accurate and complete. The users can verify the accuracy and completeness or update it to include corrections or additional information.

Different components of the content management system may be configured to ensure that the container is complete, to set flags indicating a completeness status and to send alerts to users. In some embodiments, the application on which the content is created may read the container file, compare the contents to the expected contents and determine whether the container is complete. This function may also be performed by a server and data store storing containers (e.g., server 126 and data store 122). Also, viewer applications or other creator or editor applications (in addition to the specific application on which the content was created) may also be configured to perform these functions.

In operation 226, the content management system can be configured to distribute one or more containers at the direction of or with the permission of their respective creators or other custodians. For example, a creator may direct the content management system (e.g., the creator's application or the server) to send one of his or her container files to a third party. The content management system can send the container to the designated recipient or recipients and track the container. The container can be protected such as by encryption, by password protection, by keying it to designated recipients, and so on. The system can set up tiered protection such that different recipients might have different levels of access to the container and the contents therein. For example, some recipients might be able to access everything in the container, whereas other recipients might only be able to access certain container items. As another example, some recipients might be given read-only access to one or more items in the container whereas other recipients might be given read/modify/write access. The system can be configured to track every user or entity who had access to the content as well as rights that were given to such users and entities as well as their access parameters such as, for example when they accessed it, what they accessed it, for how long they accessed it, and so on.

In various embodiments, the custodian or custodians may be dynamic in that they can change over time as permissions change, such as when new persons are given access levels to view/modify content, or permissions are revoked from other persons.

The system may further be configured such that when the file is opened, the viewer application verifies the data in the local copy of the container against the data in the primary storage location (e.g., the data stored in the cloud) to determine whether any changes have been made since the transfer. If any changes were made, those changes may be highlighted to the viewer. Additionally, if authorized, an updated version of the file can be downloaded to the viewer. Likewise, changes made by a file recipient can be shared with other custodians (e.g., original content creators, other authorized viewers or editors) and they can be highlighted so that changes can be easily identified. Embodiments may require that such changes be approved by an authorized custodian prior to acceptance.

Figure 4:
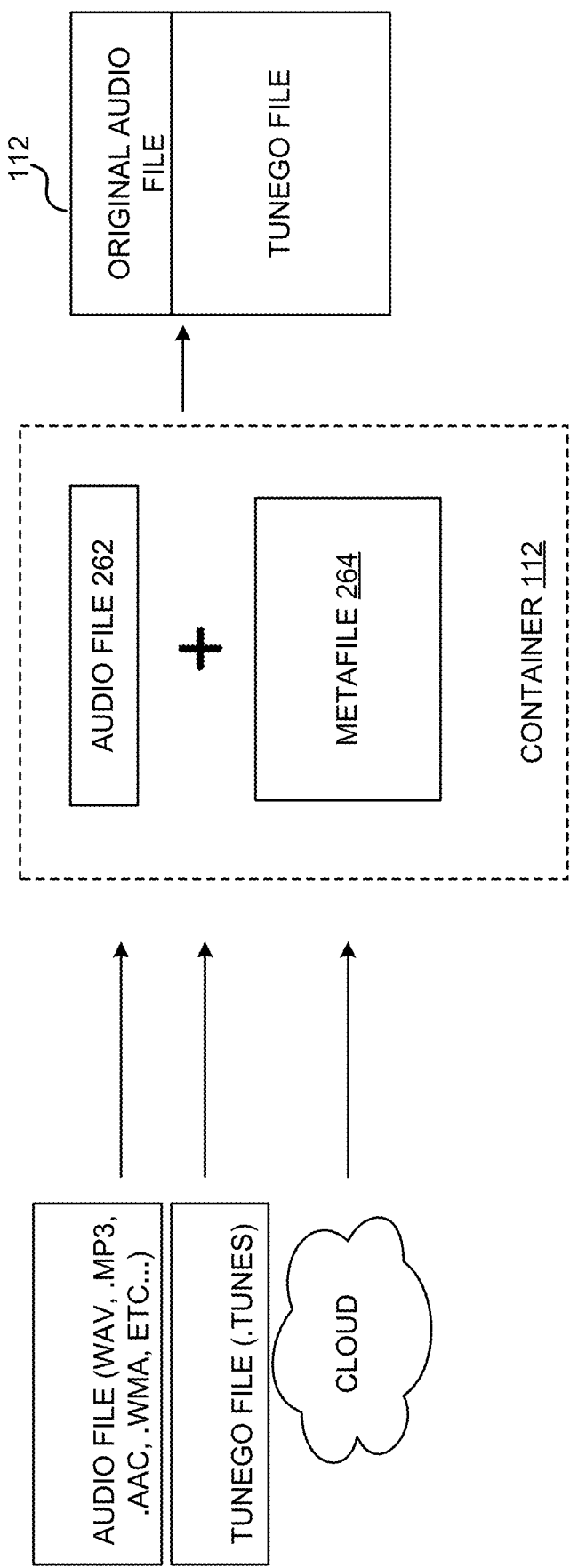
FIG. 4 illustrates an example creation of a content container in accordance with one embodiment.

FIG. 4 illustrates an example creation of a content container in accordance with one embodiment. More particularly, FIG. 4 illustrates an example of how an existing audio file such as a WAV, MP3, etc. file can be associated with, concatenated with or appended to include metadata (e.g. .TUNES data) and other data from the cloud to create a new file that could be played with an existing audio player (such as a conventional mp3 player). In this example, the resulting file includes the original audio file and information or data that might be included with it, and the additional metadata while retaining compatibility for play back with a conventional audio player. In this example, an original content file (in this case an audio file) 262 and a content metafile 264 are loaded into container 112. Content file 262 created by one or more creators might be a file such as a WAV, MP3, AAC, WMA or other audio file. The final container in this example includes the original audio file (or files) and the metafile(s).

Metafile 264 can be a collection of data that is added to container 112. In other embodiments, metafile 264 may be a specific or proprietary file structure that has a specified file format and may require a particular application to read, write or modify it. In the example illustrated in FIG. 4, metafile 264 is a proprietary .TUNE file type accessed with a compatible application. In other embodiments, other file types may be specified. In another application, the container 112 is a file with a specified file format (e.g., the .TUNE file) that can be loaded and accessed/played with a corresponding file player.

This example of FIG. 4 can be implemented to preserve backward compatibility with existing audio players while still including the capability to associate or store metadata which might be accessed, for example, via a particular viewer or application. Stated another way, embodiments may append metadata to an existing standard audio file while maintaining backwards compatibility with existing audio players so they can play the file as a standard playable audio file, but when the container is opened by a proprietary app configured to work with container files, the app would know how to play the file and extract all the additional metadata as well.

Figure 5:
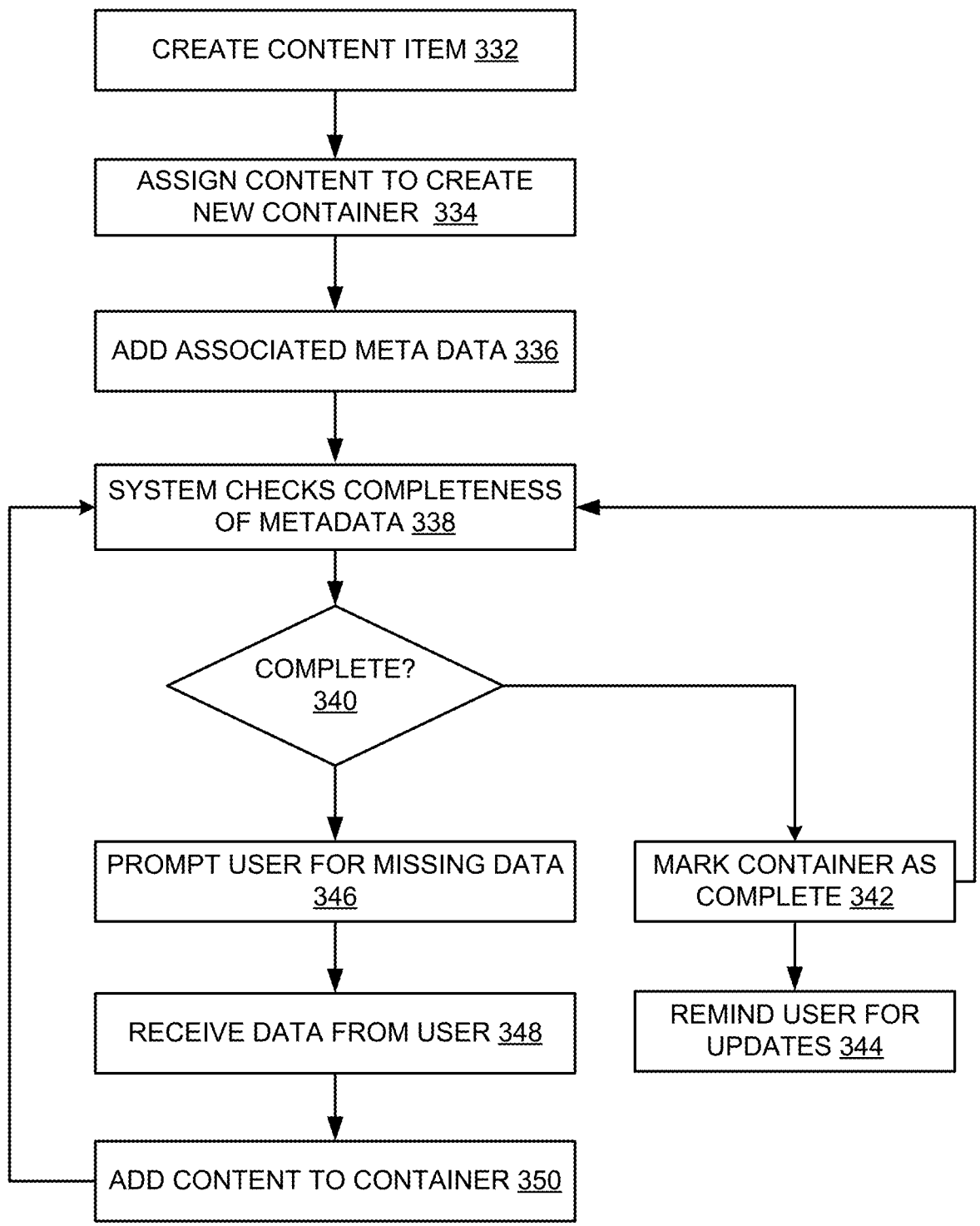
FIG. 5 illustrates an example process for creating a container in accordance with one embodiment.

FIG. 5 illustrates an example process for creating a container in accordance with one embodiment. At operation 332, one or more creators create a content item. For example, recording artists/musicians may record a song or an album. At operation 334, the creators provide the content they created to a content management application (e.g., content management application 115) so that the content can be assigned a container 112. Accordingly, the application receives the content created at operation 332 and creates a container in which the received content can be stored. At operation 336, the creators or other authorized users add metadata associated with the created content to the created container. Accordingly, the application receives the metadata associated with the content created at operation 332 and stores this metadata in the container 112 created for the content. Although the metadata may be stored in any of a number of different file formats, some examples of metadata file formats are described below.

At operation 338, the system checks for the completeness of metadata. Specifications may be created identifying the types of metadata items that are expected to be included for a particular content type. Accordingly, the system may identify the content type (e.g., based on the file extension or extensions for multiple files, or based on an identification provided by the creator on a UI), retrieved the appropriate specification for the content type or types included in the container and check the metadata file to determine whether specified content is included. In terms of the example depicted in Table 1, the system may check to ensure that creator information is included, album artwork is included, royalty payment information is included, copyright information is included, and so on. In other implementations, creators may be given the option to edit the standard specification for metadata for their particular content or to provide a custom specification for their content. In such applications, the system may compare the metadata on file with the custom or semi-custom specification to determine completeness.

Once the system verifies that the content is present in the metadata is complete, the content management system marks the container accordingly. As noted above, this may include setting a flag for the container, adjusting a container name, providing an appropriate designation in a field for the container, emailing the appropriate users (e.g., creators or other authorized users) or other appropriate designation technique. This is illustrated at operations 340 and 342. The system may also inform the user that it believes the container is complete. The system may continue at operation 338 to perform periodic checks for completeness of the container. These checks may be performed at regularly scheduled intervals based on system settings or user preferences. These checks might also be triggered by system events such as request to share content, actions to edit or update content, actions to view or listen to content, and so on.

At operation 344, even where the system has determined from its checks that the metadata appears to be complete, the system may be configured to periodically remind the creators or other designated users to update the metadata or to check the metadata to ensure that it is still current and complete. Users may be able to set the timing for periodic updates or this timing may be predetermined in the system. Updates may also be triggered based on events. For example, when a user requests that content be shared with a third party, the system may prompt the user at that time to confirm that the metadata is up-to-date and complete.

If upon completing its verification the system determines that the container is incomplete, the system may prompt the appropriate user or users for any missing data or information. This is illustrated at operations 340 and 346. In some applications the user may simply be provided with a warning that the metadata file appears to be incomplete or that content appears to be missing. In other applications, the system may provide a specific listing to the user or users of content or metadata items that appear to be missing. Accordingly, the user may use this warning as an opportunity to complete the metadata information.

Where the user subsequently provides additional content or metadata to be added to the container, at operation 348, the system receives this additional data from the user. At operation 350, this data is added to the container. The system may continue at operation 338 to perform periodic checks for completeness of the container. These checks may be performed at regularly scheduled intervals based on system settings or user preferences. These checks might also be triggered by system events such as request to share content, actions to edit or update content, actions to view or listen to content, and so on.

In various embodiments, the content management system may further be configured to prohibit users from sending or sharing files to others if the metadata appears incomplete. The system may be configured to allow the user to override the safeguard, in essence verifying that the user has confirmed the completeness of the metadata despite the systems warning or that the user is otherwise satisfied that the file can be appropriately shared.

Figure 6:
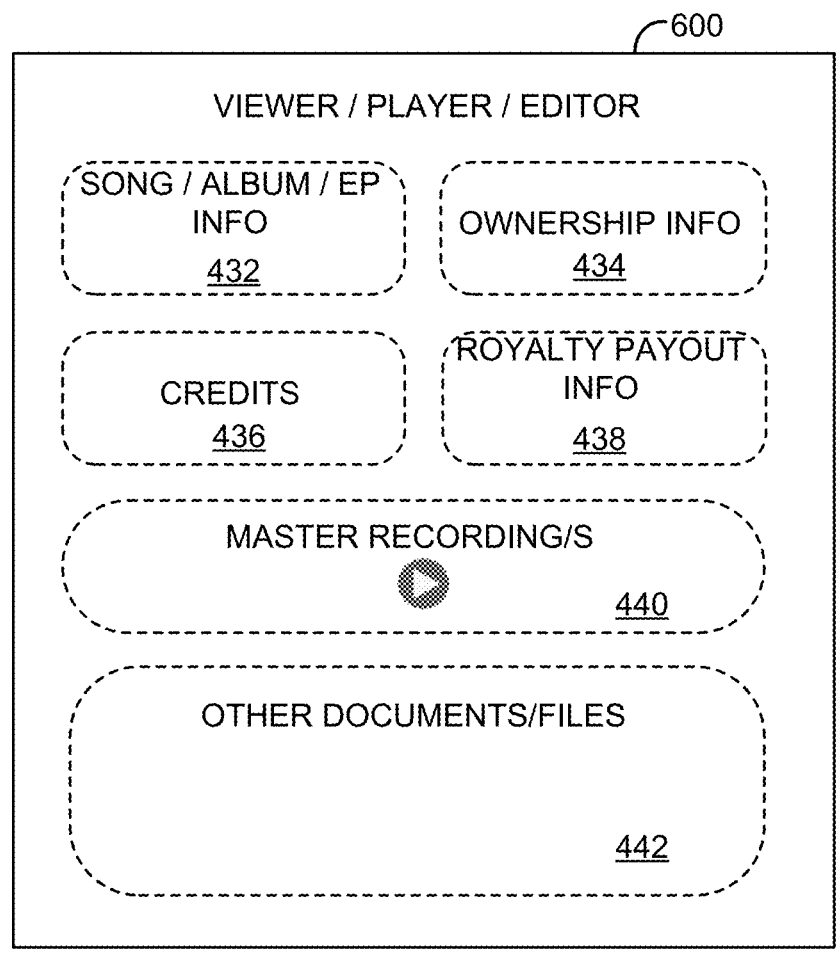
FIG. 6 illustrates an example UI for an application for a content management system in accordance with one embodiment.

FIG. 6 illustrates an example UI for an application (e.g., application 115) for a content management system. This can be implemented as the UI to allow users to view play or otherwise access content in a container, view metadata associated with that content in the container and edit the content or the metadata in the container. With reference now to FIG. 6, this example UI 400 includes a plurality of user selection elements (e.g., physical or touchscreen buttons) allowing the user to access the information. Shown are user selection elements for content information 432, ownership information 434, credits information 436, royalty payment information 438, master recordings 440, and other documents and files 442. Selection of these user selection elements allows the user to drill down to the next level of data stored in the application. For example, selection of content information 432 (in the case of audio content, song/album/EP information) allows the user to view or edit this information. Selection of the master recordings 440 element allows the user to play the stored audio or A/V content or to view stored image content. FIG. 6 illustrates just one example of a UI layout. In other embodiments, other layouts may be provided and other user selection elements for different data items can be provided.

Figure 7:
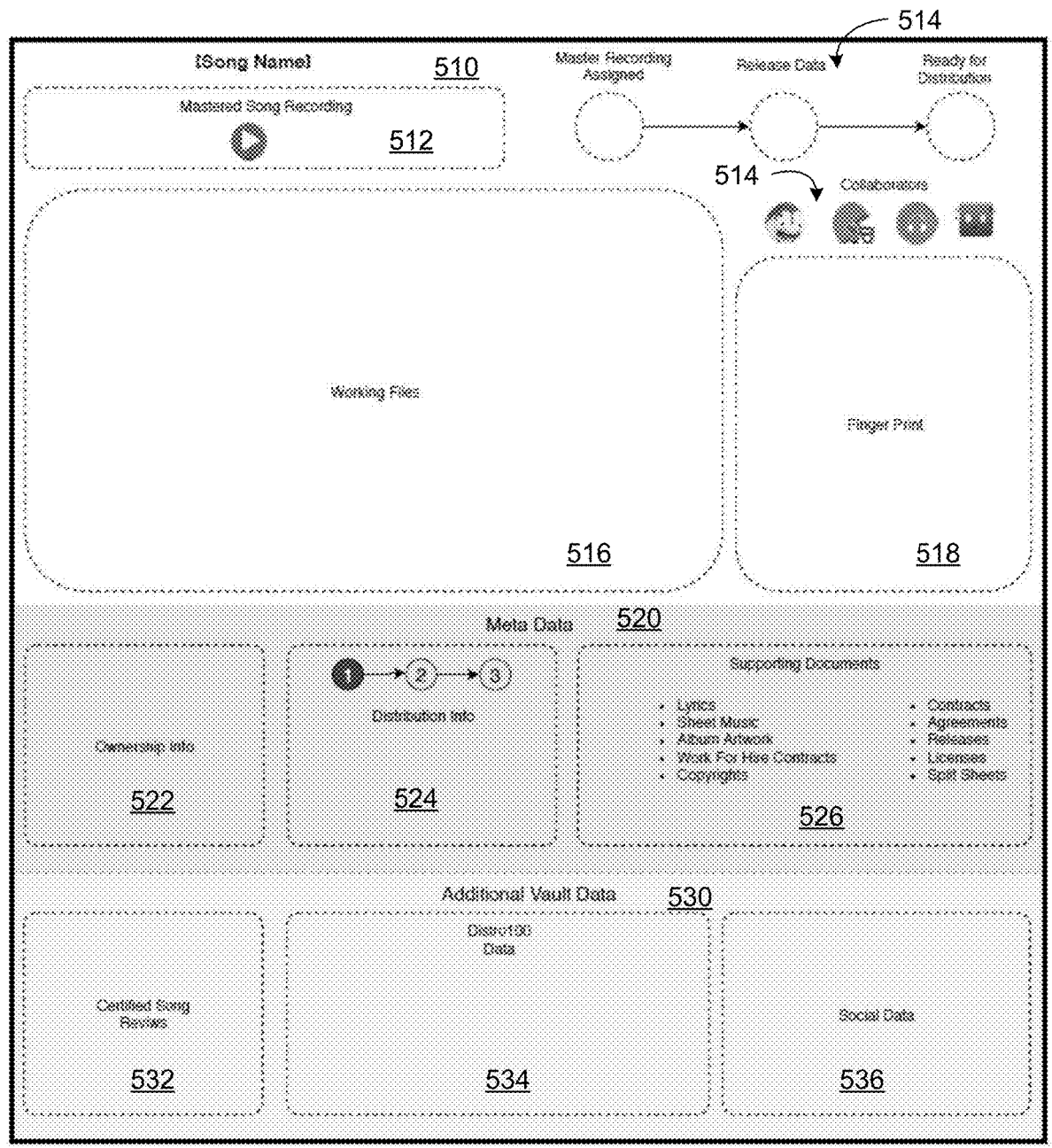
FIG. 7 illustrates an example UI for a container viewer in accordance with one embodiment.

FIG. 7 illustrates an example UI for a container viewer in accordance with one embodiment. As with the example of FIG. 6, FIG. 7 illustrates just one example of a UI layout. In other embodiments, other layouts may be provided and other user selection elements for different data items can be provided. This example includes a file portion 510, a metadata portion 520 and an additional vault data portion 530. Referring to file portion 510 first, master recording element 512 allows an authorized user to access and play/view the content stored in the container. Actuation of master recording element 512, may launch an appropriate player application and cause the associated content to be played.

Status element 514 allows a user to view and update status information relating to assignment of master recording, release dates, and distribution dates. In some embodiments, this information can be displayed in the form of dates such as the date the master recording is assigned, the release date, and the date it is ready for distribution. States may be captured by the system and displayed based on system activities (e.g., the actual date that content was released through the system) or they may be manually set an update. In other embodiments, the status information can be displayed in the form of indicators (as opposed to dates) such as a GREEN status indicator indicating complete, a YELLOW status indicator indicating partially complete and a RED status indicator indicating incomplete.

Working files element 516 allows the user to access the content files associated with the master. This may allow authorized users to review and modify the content files themselves. Actuation of working files element 516 may launch an appropriate editor application allowing the content to be accessed, reviewed and modified by the authorized user.

Fingerprint element 518 can be included to provide a container fingerprint. The container fingerprint can include an audit log of activities occurring associated with the container. Activities may include actions such as changes to the container contents (e.g., updates, additions, deletions), access actions, transfers/shares of the container, and other events. The activities may also include an identification of those accessing the container, the date and time of access, duration of access, portions of the content accessed and so on. The log may, like other contents, be encrypted or otherwise protected. Container activities can also be managed and tracked using blockchain or other distributed ledger technology.

Metadata section 520 can provide user interface elements to allow users to access and revise metadata for the container. This example illustrates user interface elements for ownership information 522, distribution information 524 and supporting documents 526. Selection of interface element for ownership information 522 allows the user to pull up, view and modify ownership information for the content in the container. Selection of interface element for distribution info 524 allows the user to pull up, view and modify current distribution information. This may be used to track and display parties to whom content has been distributed, set distribution parameters for parties to receive the information (e.g., identify who where and when to send the associated content or the entire container), and to track dates and times of distribution and access. Selection of interface element for supporting documents 526 can allow users to pull up, view and modify other metadata items in the container such as, for example, associated song lyrics, sheet music, album artwork, contracts, copyright information, licenses, and so on.

Additional vault data portion 530 may be included to allow additional data to be tracked and stored for the content in the container. This example includes three storage elements, certified song reviews 532, distribution information (e.g., Distro100 data) 534, and social data 536. The certified song reviews storage element stores reviews of the content and allows a user to access and view reviews of the content. In some cases, reviews may be limited to certified or verified reviews, whereas in other implementations, all reviews can be included. Distribution information interface element stores, and allows the user to access, view and modify distribution data regarding the who/when/where the content was distributed on a streaming basis. Streaming data from providers such as TuneGo™, Distro100™, Spotify™, Pandora™, and others can be accessed via this interface element. Social data storage element 536 stores and allows the user to access data gathered by the system from social media and like sites. The gathered data may relate to the content, the artist, the publisher or other like information. The system may also store and allow the user to access social media links where this information can be accessed from its source.

In various embodiments, these and other additional vault data items can be collected by unaffiliated or third-party service providers and aggregated for quick and easy access by the container application user. As the above examples illustrate, listener/critic review data from multiple sources, streaming data from a plurality of streaming providers and social data from various social media sources can be collected, distilled and made available to the user via the interface elements in additional vault data portion 530. Note that each of the interface elements in FIGS. 6 and 7 may be used to access an item directly or to drill down to a deeper level user interface.

Figure 8:
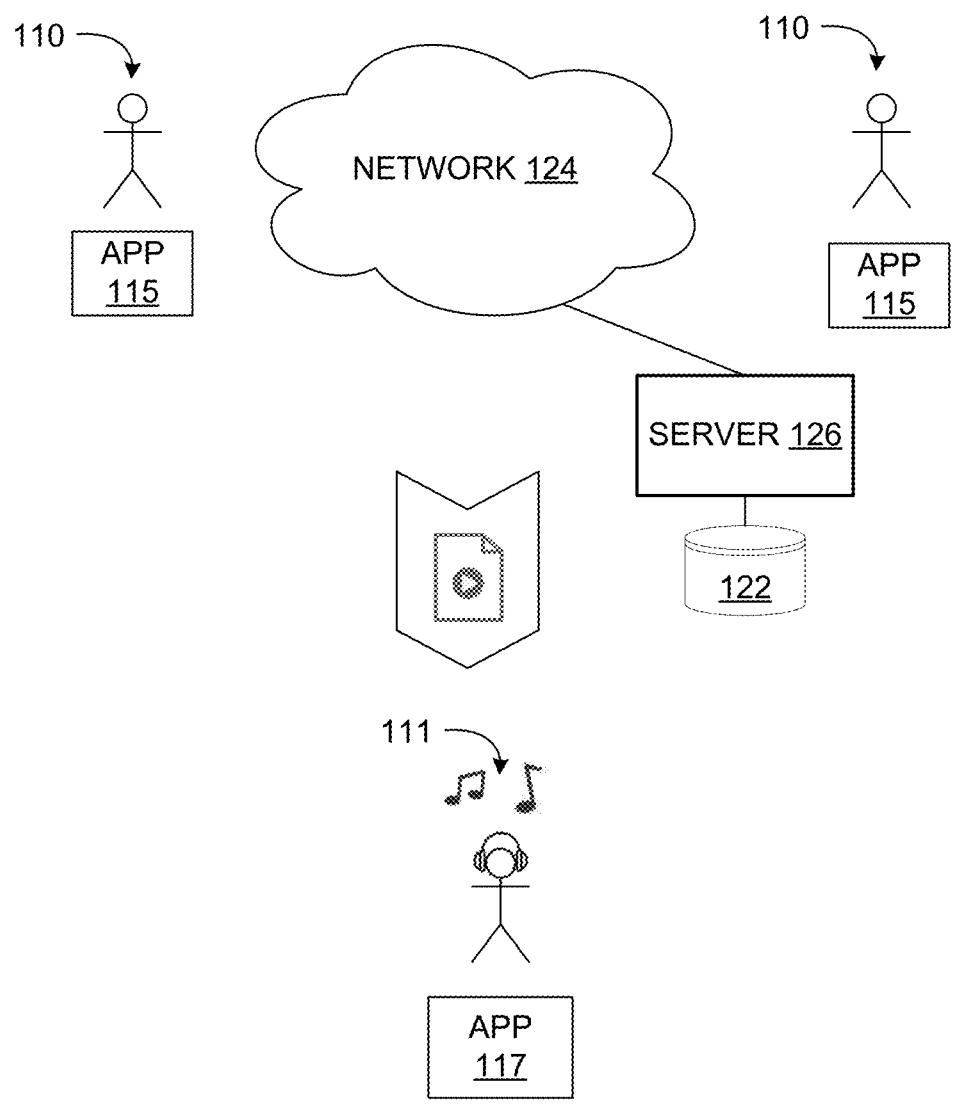
FIG. 8 illustrates an example scenario of collaborative music creation in a cloud environment in accordance with one embodiment.
Figure 9:
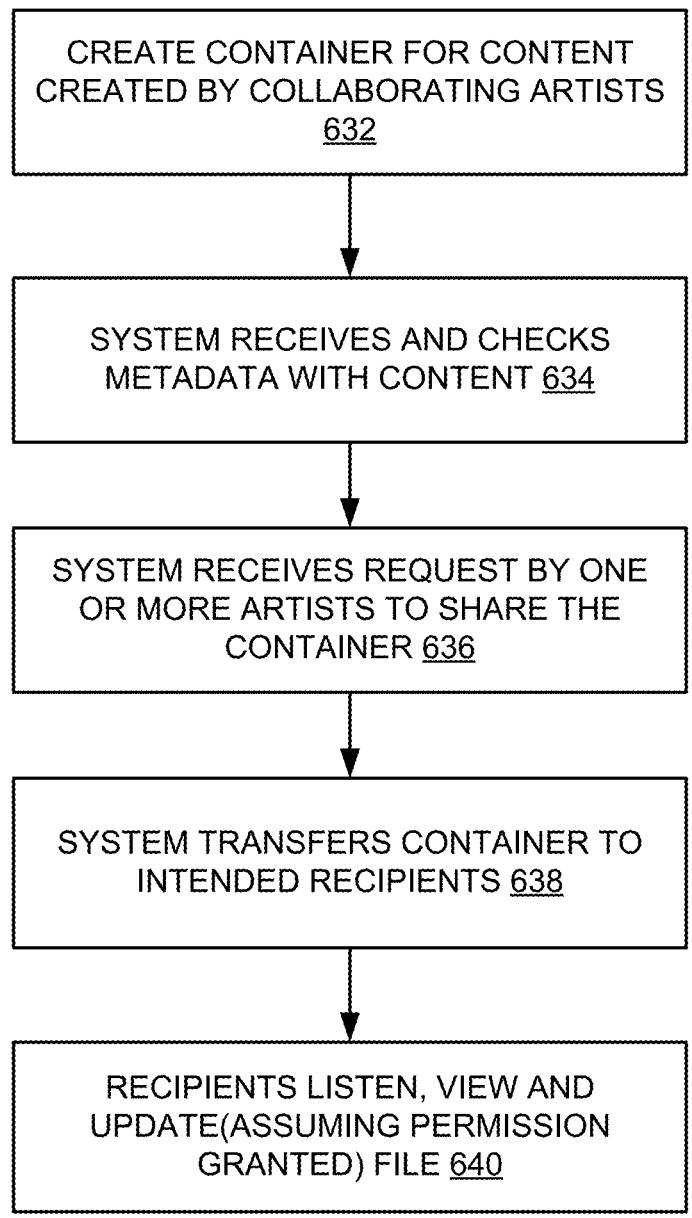
FIG. 9 illustrates an example process for collaborative music creation in accordance with the example of FIG. 8.

FIG. 8 illustrates an example scenario of collaborative music creation in a cloud environment in accordance with one embodiment. FIG. 9 illustrates an example process for collaborative music creation in accordance with the example of FIG. 8. In this example, two creators 110 use applications 115 to create content, which can be stored on a data store 122 (e.g., a vault) at server 126. Creators 110 use the system to share their content file, or a container 112 including the content file with a third party 111.

At operation 632, the system creates a container to contain the content created by creators 110 and the associated metadata. Creators 110 may use the system application 115 to collaboratively create the content and store it in a container with the associated metadata (e.g., as an audio file 262 and a metafile 264). At operation 634, the system verifies that the metadata associated with the content is complete. For example, this verification can be performed by application 115 during or after content creation or by server 126 when the container is provided to data store 122 for storage.

At operation 636, the system receives a request by one or more of the creators 110, or from an authorized user, to share the content or the entire container 112 with a designated recipient 111. This may be done, for example through application 115, server 126 or a combination of the two. The system can check appropriate permissions to determine whether the requested transfer is permitted. The system can also check completeness of the container before transferring and issue any alerts, if appropriate, depending on the status of the completeness of the container. Examples of a designated recipient may include, a producer, creator, manager, record label, publisher, and so on.

Assuming the users are authorized and the transfer permitted, the system transfers the container 112 to the designated recipient 111 at operation 638. At operation 640, the recipient accesses the container and the content therein using an application 117. In various embodiments, application 117 may be the same as or similar to application 115. In some implementations, application 117 may be limited to a playback only application whereas another implementations, application 117 may be a fully functional application allowing playback and modification. The system may be configured such that application 115 or server 126 keeps track of the transfers made and can provide reporting to the user such as, for example via the user interfaces such as those exemplified in FIGS. 6 and 7.

Upon authorizing a transfer, a sender may specify different levels of permission for different recipients. In some instances, certain recipients may have set levels of permissions. Permissions can identify parameters such as access types (review, modify, etc.), number of times access is permitted, durations or time windows in which access is permitted, further sharing rights, and so on. Assuming recipient 111 has the appropriate permissions, recipient 111 may modify the content or the metadata and, using application 117, save and updated container file locally or in data store 122, or otherwise transfer the updated container file to the content creators 110 or other content centers.

Figure 10:
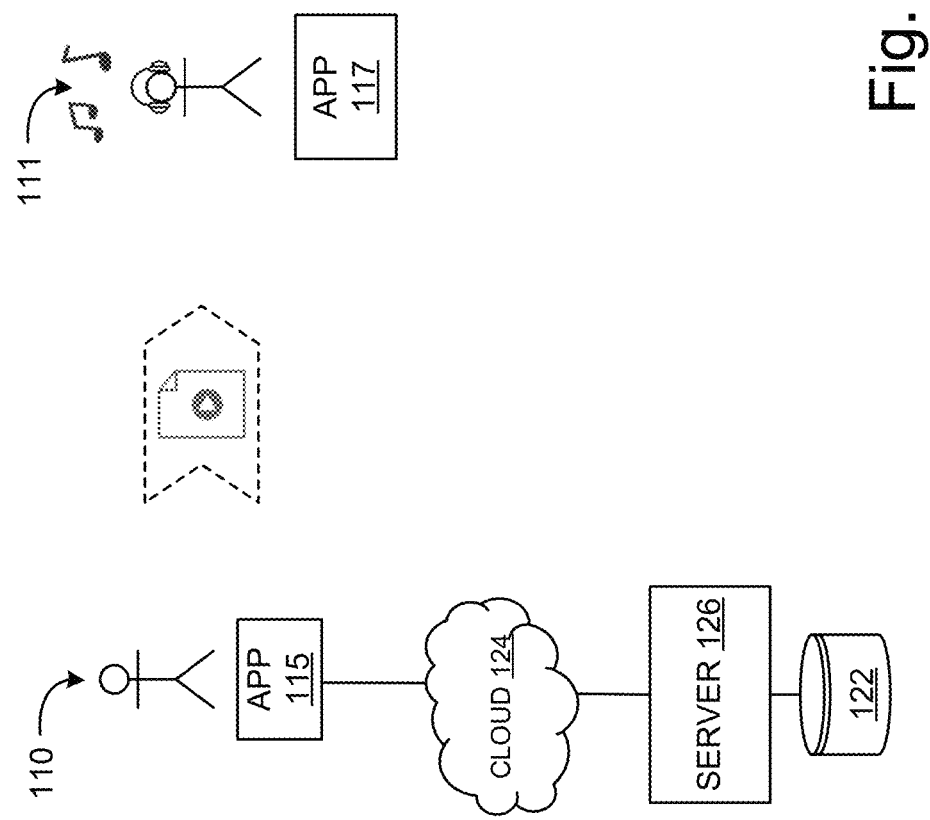
FIG. 10 illustrates an example scenario of music creation in a local environment in accordance with one embodiment.
Figure 11:
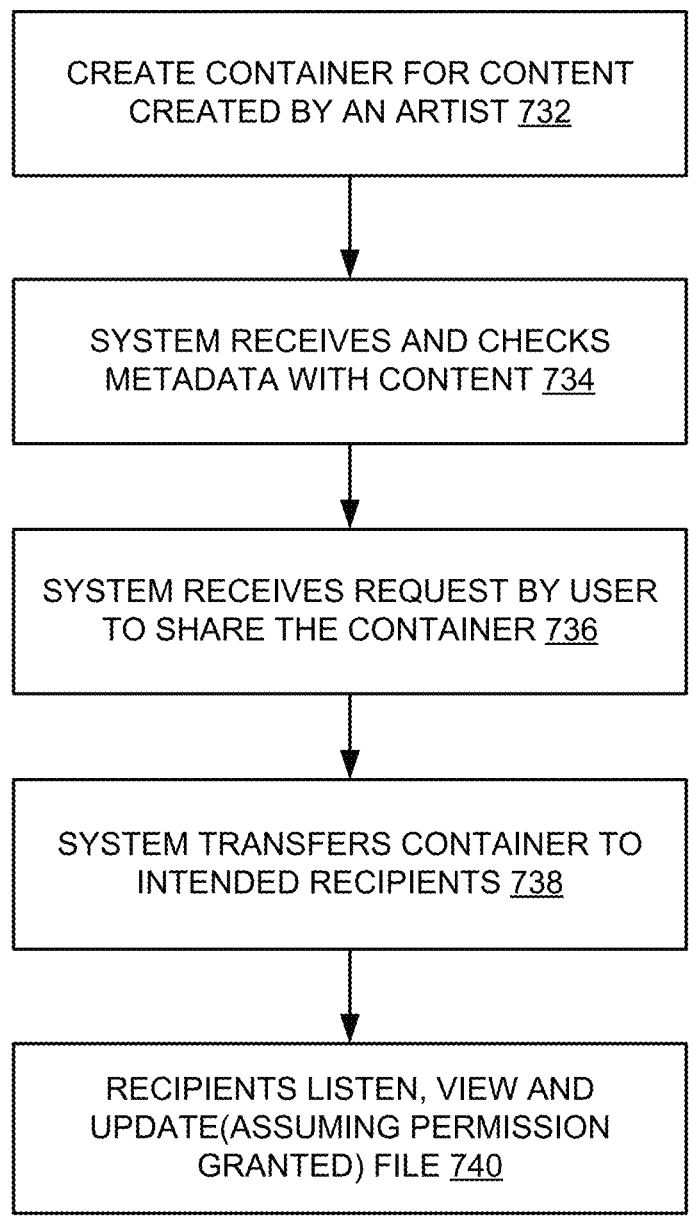
FIG. 11 illustrates an example process for music creation in accordance with the example of FIG. 10.

FIG. 10 illustrates an example scenario of music creation in a local environment in accordance with one embodiment. FIG. 11 illustrates an example process for music creation in accordance with the example of FIG. 10. In this example, a creator 110 uses an application 115 to create content, which can be stored on a data store 122 (e.g., a vault) at server 126. Creator 110 uses the system to share its content file, or a container 112 including the content file with a third party 111.

With reference now to FIGS. 10 and 11, at operation 732, the system creates a container to contain the content created by creator 110 and the associated metadata. Creator 110 may use system application 115 to create the content and store it in a container (e.g., container 112) with the associated metadata (e.g., as an audio file 262 and a metafile 264). At operation 734, the system verifies that the metadata associated with the content is complete. For example, this verification can be performed by application 115 during or after content creation or by server 126 when the container is provided to data store 122 for storage.

At operation 736, the system receives a request by creator 110, or from an authorized user, to share the content or the entire container 112 with a designated recipient 111. This may be done, for example through application 115, server 126 or a combination of the two. The system can check appropriate permissions to determine whether the requested transfer is permitted. The system can also check completeness of the container before transferring and issue any alerts, if appropriate, depending on the status of the completeness of the container. Examples of a designated recipient may include, a producer, creator, manager, record label, publisher, and so on.

Assuming the user requesting transfer is authorized and the transfer permitted, the system transfers the container 112 to the designated recipient 111 at operation 738. At operation 640, the recipient accesses the container and the content therein using an application 117. The system may be configured such that application 115 or server 126 keeps track of the transfers made and can provide reporting to the user such as, for example via the user interfaces such as those exemplified in FIGS. 6 and 7.

Figure 12:
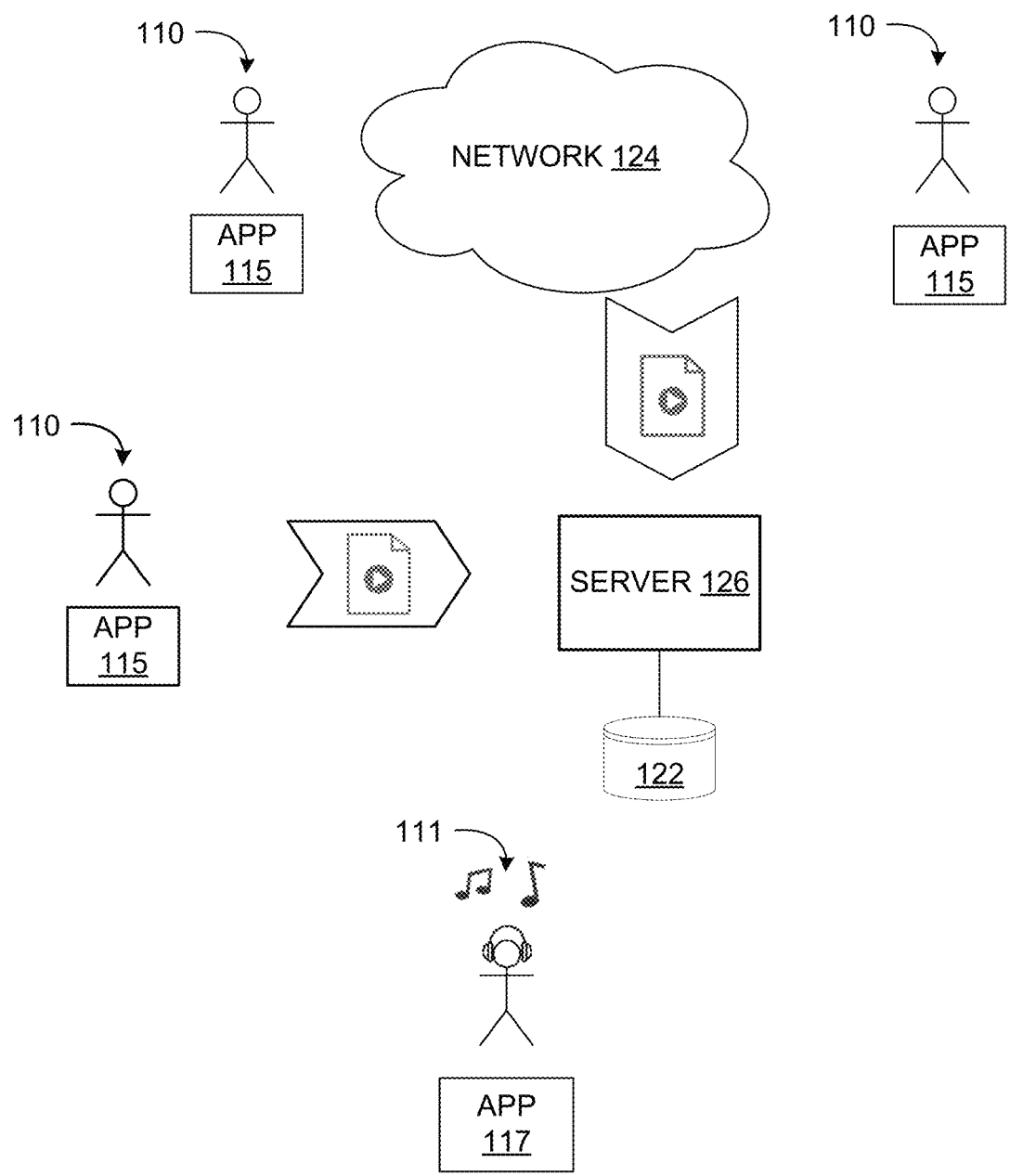
FIG. 12 illustrates an example scenario of hybrid music creation in which multiple creators create content in a cloud-based environment and another collaborator performs content creation in a local environment.

FIG. 12 illustrates an example scenario of hybrid music creation in which multiple creators 110 create content in a cloud-based environment and another collaborator performs content creation in a local environment. This example combines the example illustrated in FIGS. 8 and 9 with the example illustrated in FIGS. 10 and 11.

In the various examples disclosed herein, the transfer of a container 112 for the files therein can be made by sending the container or files themselves or by sending a link to a location where the container or the files therein can be accessed. For example, the system may send a recipient a link or other designation to access the container stored in data store 122.

Upon authorizing a transfer, a sender may specify different levels of permission for different recipients. In some instances, certain recipients may have set levels of permissions. Permissions can identify parameters such as access types (review, modify, etc.), number of times access is permitted, durations or time windows in which access is permitted, further sharing rights, and so on. Assuming recipient 111 has the appropriate permissions, recipient 111 may modify the content or the metadata and, using application 117, save and updated container file locally or in data store 122, or otherwise transfer the updated container file to the content creators 110 or other content centers.

If a recipient does not have appropriate permissions, the system may be configured to allow the recipient to submit a request for the particular permission desired (e.g., to update a particular item of data) and to present the request to designated owners/admins of the data for approval or denial. Users may be given the ability to adjust settings to specify the various notifications they would like to receive throughout the process of sharing data with other parties.

Application 115 may be implemented to facilitate metadata tracking and update. Embodiments can include the ability to display metadata to the user so that the user can make appropriate updates. The system can further be configured to reach out through network connections to verify of any metadata is out of date. Any out of date data can be flagged and visually highlighted so the user knows that it is stale data.

In various embodiments, creative asset metadata (including associated documents) may be appended to an existing media file in another file format such as an .mp3, .wav, or other file. In the process, this may create a new file that is readable in its native file format by existing applications such as an audio player capable of reading such files. This preserves the playability/accessibility of the original content if that is desired. The file may be converted in such a way that when the file is opened by the specific Viewer/Reader (e.g., application 115) the application will be able to extract, display and play the additional content.

Figure 13:
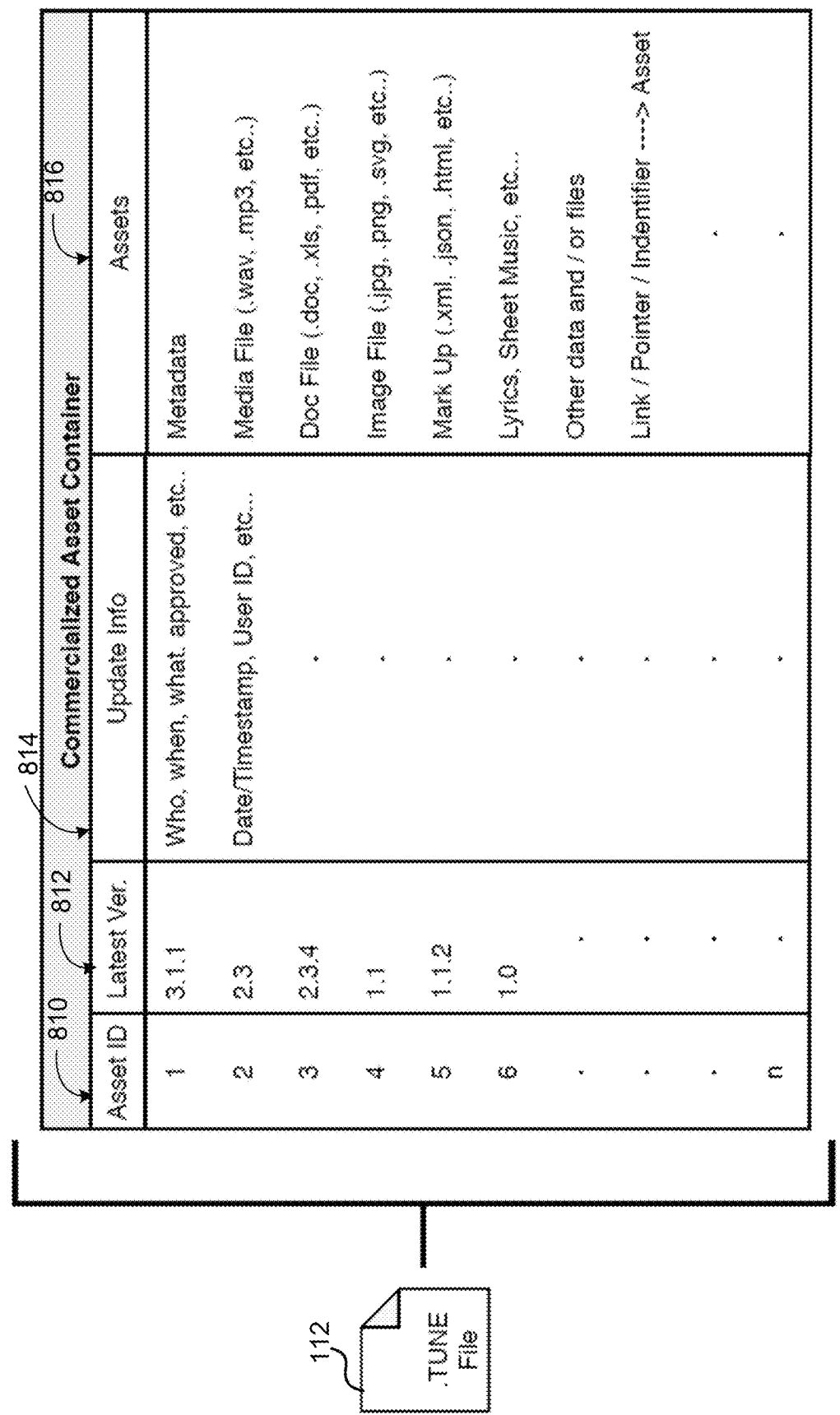
FIG. 13 illustrates an example description of a descriptor file for contents of a container in accordance with one embodiment

FIG. 13 illustrates an example description of a descriptor file for contents of a container 112 in accordance with one embodiment. In this example, the descriptor file includes, for each asset, an Asset ID 810, version information 812, update information 814 and identification of the asset itself 816. Asset ID can be any identification information to identify the various assets in the container, preferably such that each asset may be uniquely identified. In this example, a numeric designation 1-N is utilized. Where different versions are contemplated and may be tracked, version information 812 can be used to designate and display the current version of the asset item. In this example, version numbers of the format X.Y.Z are used, although other formats may be utilized. Update information 814 can be used to capture and display information relative to the version number. This example illustrates displaying who made the update, when it was updated, what the update entails, how it was approved, and so on. The asset identification 816 itself in this example is a listing of the file. For example, the assets in this container include a content file (e.g., media file in the form of a .wav, .mp3, etc file), a document file (e.g. for contracts), an image file (e.g., for album cover art), and so on. In some embodiments, the .TUNE file itself can include a version number for version tracking such that when updates are made to the contents of the container, that container's version number can also be updated.

In various embodiments disclosed herein, metadata information can be multiple separate metadata files or a metadata file including multiple items of metadata content such that can also be loaded into or associated with a container 112. The metadata can be a collection of data items that are added to container 112. In other embodiments, the metadata can be in a specific or proprietary file structure that has a specified file format and may require a particular application to read, write or modify it (e.g., a proprietary .TUNE file, although other file types may be specified).

Embodiments may be configured such that users can download or extract individual files or data from the .TUNE file, users can view and listen to the files that are included in the .TUNE file, and users can edit or update data in the .TUNE file if they have permission. The system can further be configured such that updates to a local version will also update the data on the server (126, 122 and will send notifications regarding the modifications to other users as well as the owner/admin of the content.

In this example a single audio file (label here as a Media File) is illustrated as being stored in the container. Similarly, in the example illustrated in FIG. 4, a single audio file 262 is illustrated as being stored in container 112. This audio file might be a single track or a collection of tracks (e.g., an album or partial album). Accordingly, an album can be contained in a single container file 112, or an album can be contained across multiple container files (e.g., one track of the album per container 112). The same can be said for other types of content as well.

Storing items in a container (e.g., container 112) can include, in some embodiments, packaging the items together and wrapping them in a container file. The container file can include a file name and can have the stored items embedded within the file. In other embodiments, the container 112 can be implemented in whole or in part as a virtual container and its contents could potentially be physically located in different databases or different locations but linked to or otherwise associated with their respective container 112. Accordingly, storing items in a container can include identifying the items as belonging to the container. This may be implemented by listing the file names in the container file, using a lookup table to store the filenames included in the container, identifying the corresponding container for each item by designating the container in the filename or file header, or otherwise associating the item files with the corresponding container.

Figure 14:
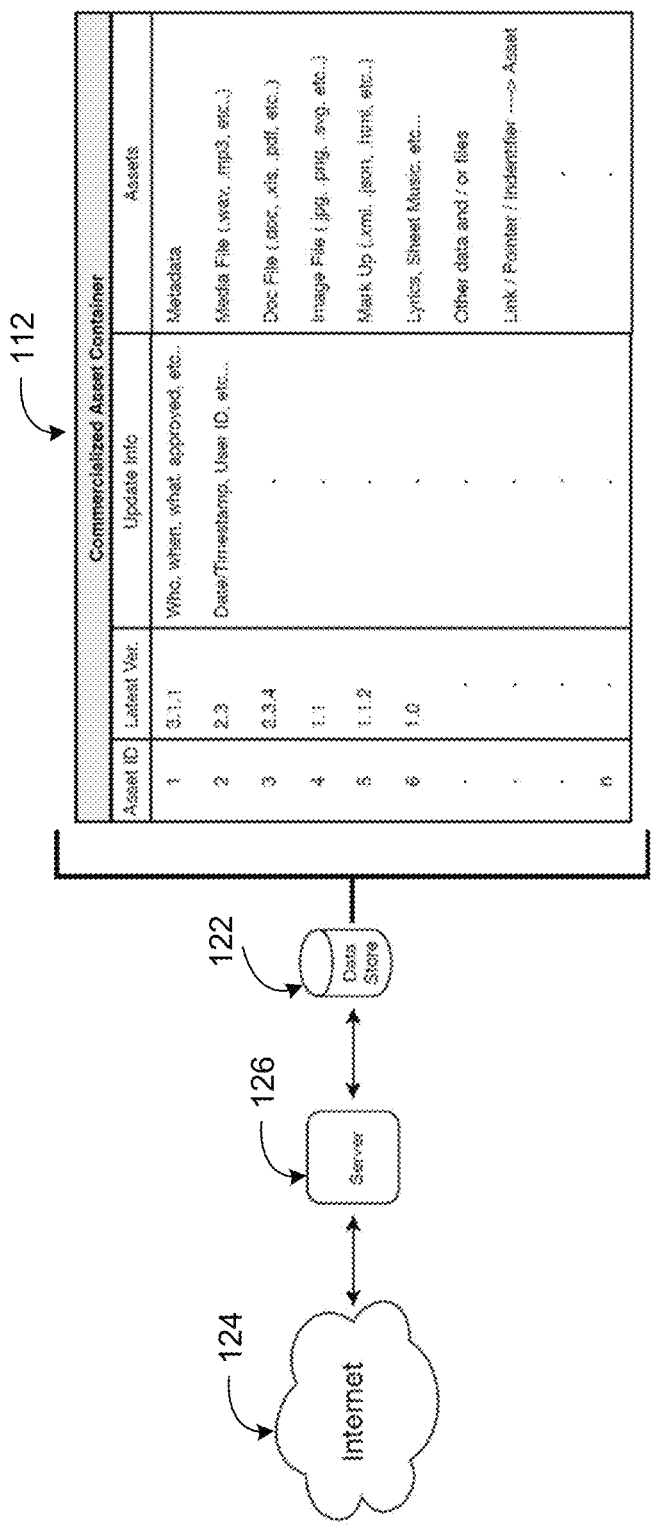
FIG. 14 illustrates an example of a container stored in a data store in accordance with one embodiment.

FIG. 14 illustrates an example of a container stored in a data store in accordance with one embodiment. In this example, container 112 is stored in data store 122 of server 126 which may be accessible via a network 124 such as the Internet.

Figure 15:
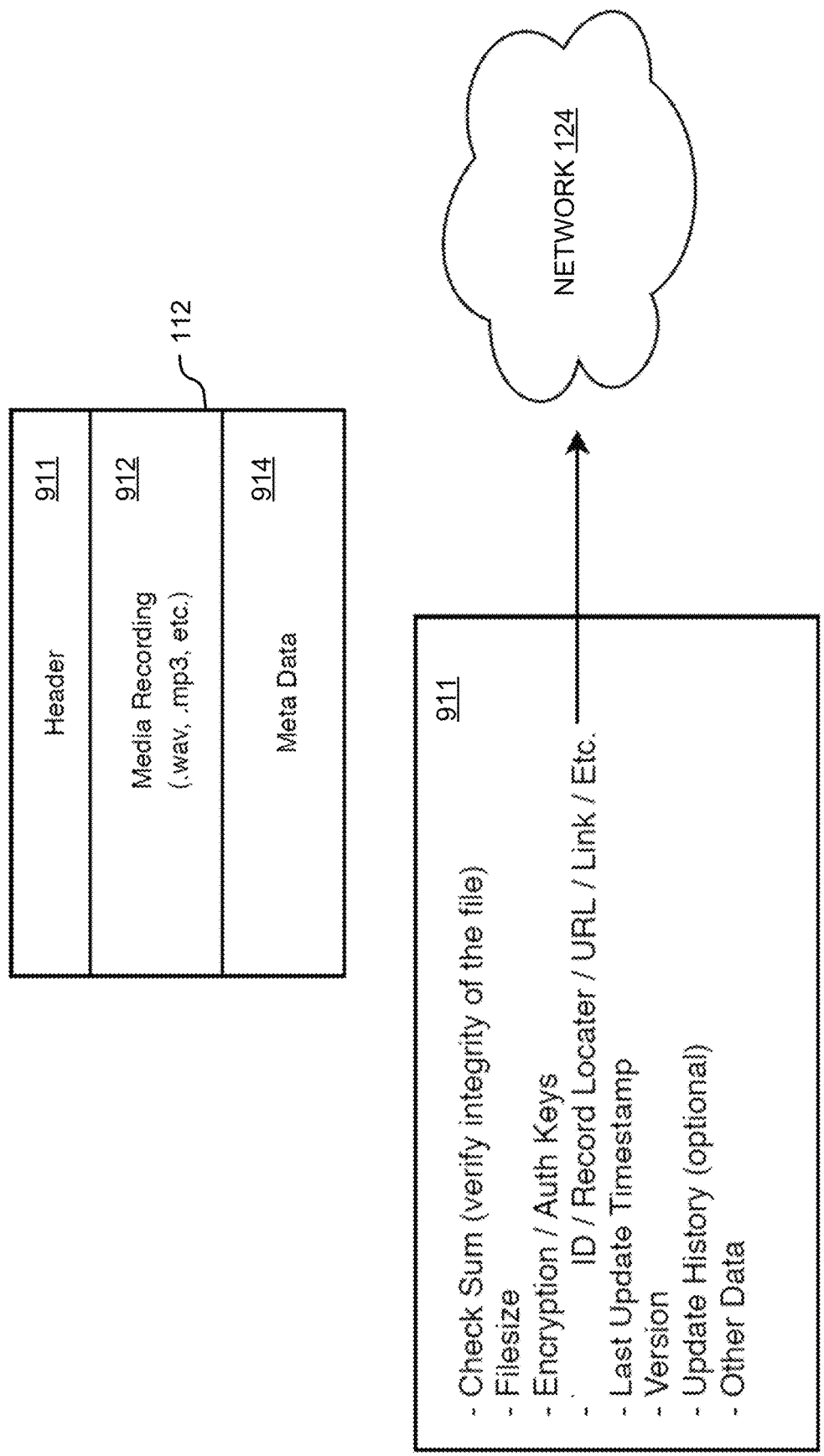
FIG. 15 illustrates an example file structure that can be used for a container file 112 in accordance with one embodiment.

FIG. 15 illustrates an example file structure that can be used for a container file 112 in accordance with one embodiment. Although any of a number of different structures can be utilized, this example structure includes a header 911, the content 912 and metadata 914. In the context of FIG. 4, content 912 may include one or more audio files 262, and metadata 914 may include a metafile 264. An example of header 911 is also illustrated in FIG. 15. Again, any of a number of different header structures can be utilized. This example header 911 includes a checksum (to verify integrity), a file size indicator, encryption information, identifying information, version information, update history, and other information. As this example further illustrates, container 112 may be sent to data store 122 or otherwise shared via network 124.

Figure 16:
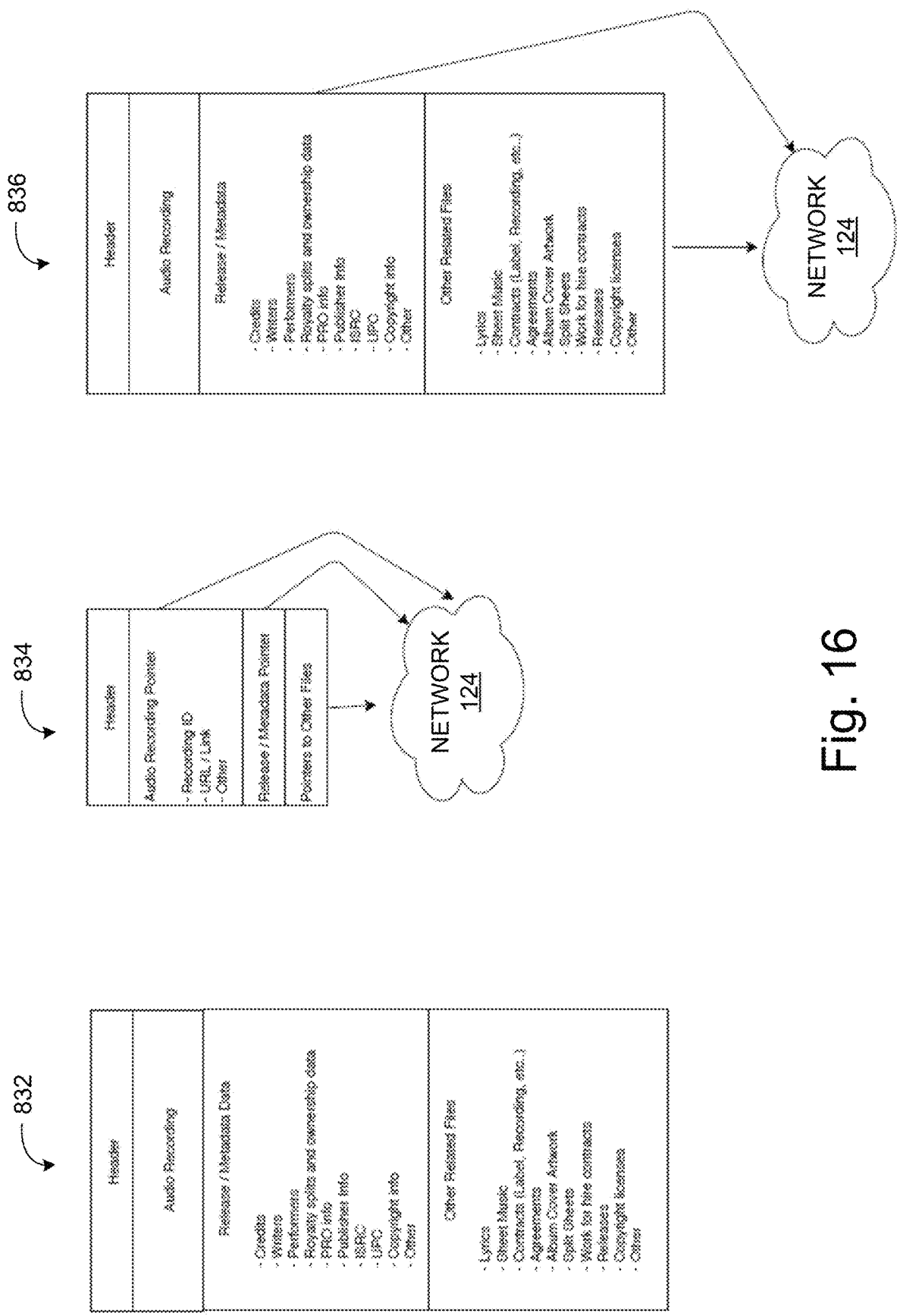
FIG. 16 illustrates examples of different forms of container storage. At 832, a fully encapsulated container 112 is illustrated.

In various embodiments, container 112 may be maintained as an integral unit and stored in one location, or copied across multiple locations. In other embodiments, information in a container 112 may be stored in multiple locations, but not necessarily all in the same place. FIG. 16 illustrates examples of different forms of container storage. At 832, a fully encapsulated container 112 is illustrated. This encapsulated container includes all data maintained in a single container. At 834, all of the data for the container (except for the header in this example) is stored external to the container. For example, it may be stored at data store 122 accessible via network 124. In other examples, the data can be stored in other locations including multiple locations. Here, pointers or indices are used to point to the locations of the files. 836 illustrates a hybrid approach in which a combination of internal (encapsulated data) and external storage are used. Here, the container includes the original audio recording, but at least some of the metadata is stored elsewhere in links or indices to that data point to the data locations.

Figure 17:
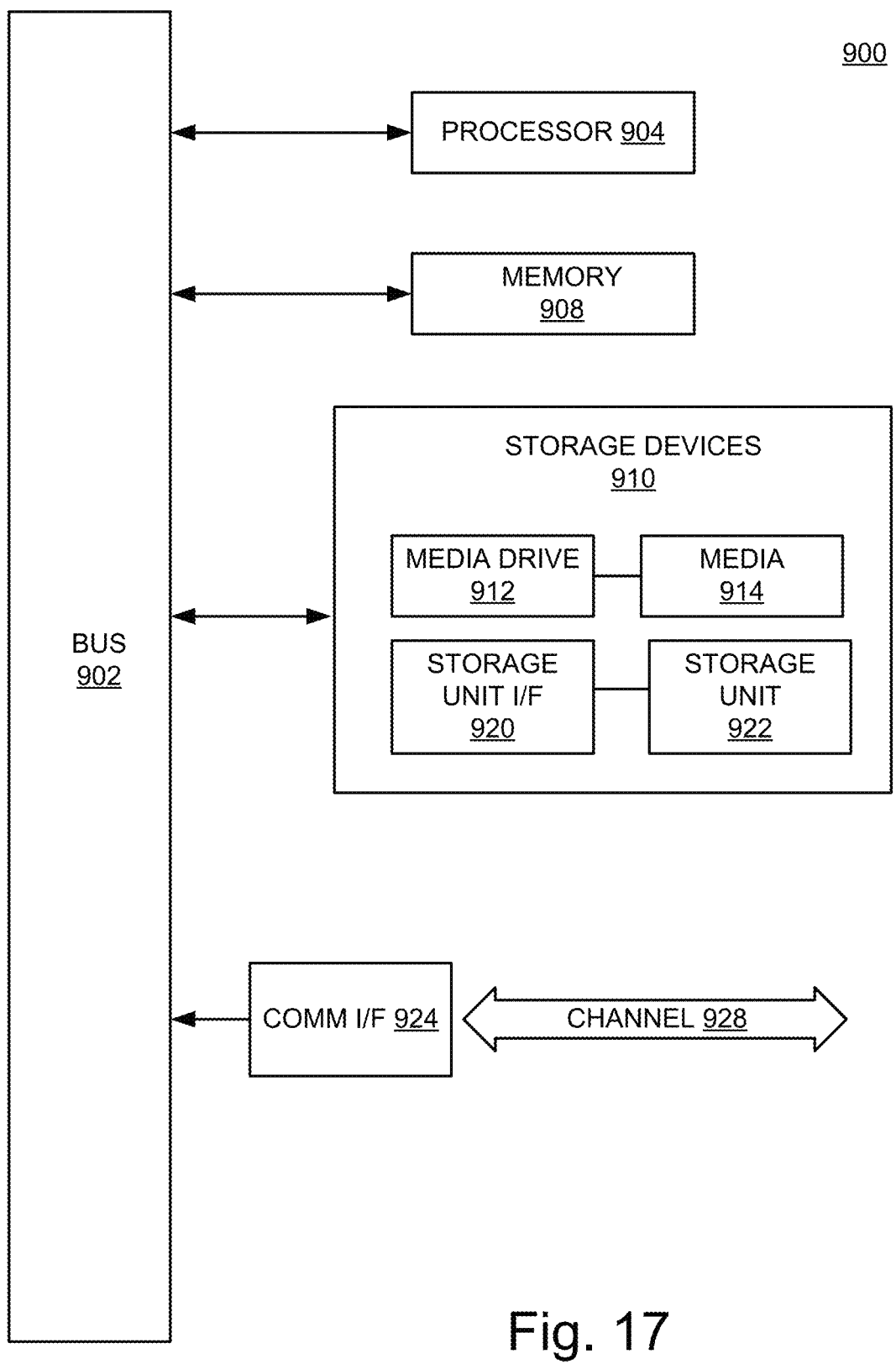
FIG. 17 illustrates an example computing module that may be used in implementing various features of embodiments of the disclosed technology.

The term "coupled" refers to direct or indirect joining, connecting, fastening, contacting or linking, and may refer to various forms of coupling such as physical, optical, electrical, fluidic, mechanical, chemical, magnetic, electromagnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

Where the disclosed technology is implemented in whole or in part using software, in one embodiment, these software elements can be implemented to operate with a computing or processing system capable of carrying out the functionality described with respect thereto. One such example computing system is shown in FIG. 17. Various embodiments are described in terms of this example-computing system 900. After reading this description, it will become apparent to a person skilled in the relevant art how to implement the technology using other computing systems or architectures.

Referring now to FIG. 17, computing system 900 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 900 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 900 might include, for example, one or more processors, controllers, control modules, or other processing devices, such as a processor 904. Processor 904 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 904 is connected to a bus 902, although any communication medium can be used to facilitate interaction with other components of computing system 900 or to communicate externally.

Computing system 900 might also include one or more memory modules, simply referred to herein as main memory 908. For example, in some embodiments random access memory (RAM) or other dynamic memory, might be used for storing information and instructions to be executed by processor 904. Main memory 908 might also be used for storing temporary variables or other intermediate information during execution of instructions to be executed by processor 904. Computing system 900 might likewise include a read only memory ("ROM") or other static storage device coupled to bus 902 for storing static information and instructions for processor 904.

The computing system 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), a flash drive, or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing system 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a flash drive and associated slot (for example, a USB drive), a PCMCIA slot and card, and other fixed or removable storage units 922 and interfaces 920 that allow software and data to be transferred from the storage unit 922 to computing system 900.

Computing system 900 might also include a communications interface 924. Communications interface 924 might be used to allow software and data to be transferred between computing system 900 and external devices. Examples of communications interface 924 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 900 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for content management, comprising:
   receiving content created by a creator;
   creating a container to contain the content and storing the content in the container;
   based on a content type of the content created by the creator, identifying items of metadata specified for the content type;
   determining that an identified item of metadata from the items of metadata specified for the content type is missing from the container;
   prompting a user to supply the identified item; and
   upon receiving one or more of the items of metadata from the user, marking the container at a given level of completeness based on the items of metadata included in the container with the one or more of the items of metadata received, wherein the given level of completeness comprises multiple levels of completeness that are defined for the container.

2. The method of claim 1, wherein the items of metadata comprise digital distribution release metadata, lyrics, composer information, royalty payment information, or work for hire contract information, and the method is further comprising:
   receiving the identified item from the user; and
   adding the identified item to the container.

3. The method of claim 2, further comprising, when all of the items of metadata specified for the content type are in the container, marking the container as complete.

4. The method of claim 2, further comprising:
   periodically checking the container to determine whether the identified item of metadata is in the container.

5. The method of claim 2, wherein the content is a standard audio file and the method further comprising:
   appending the items of metadata to the standard audio file; and
   maintaining backward compatibility with existing audio players.

6. The method of claim 1, further comprising:
   receiving the identified item of metadata from the items of metadata; and
   adding the identified item of metadata to the container by storing the identified item of metadata in the container or storing a link to the identified item of metadata in the container.

7. The method of claim 1, further comprising:
   receiving the identified item of metadata from the items of metadata; and
   checking the items of metadata to confirm that a name of the creator of the content is included in the items of metadata with the identified item of metadata.

8. The method of claim 1, further comprising:
   receiving a request by a custodian of the content to share the container with an intended recipient; and
   transferring the container to the intended recipient.

9. The method of claim 1, further comprising:
   tracking access information to the container, wherein the access information comprises an identity of a person who accessed the container.

10. The method of claim 1, further comprising:
    informing the creator that the container is complete.

11. The method of claim 1, wherein the given level of completeness corresponds with a distribution format.

12. The method of claim 1, wherein the given level of completeness for streaming services corresponds with different items of metadata included in the container than the given level of completeness for licensing activities.

13. A content management system, comprising:
    a processor; and
    a memory coupled to the processor to store instructions, which when executed by the processor, cause the processor to perform operations, the operations comprising:
    receiving content created by a creator;
    creating a container to contain the content and storing the content in the container;
    based on a content type of the content created by the creator, identifying items of metadata specified for the content type;
    determining that an identified item of metadata from the items of metadata specified for the content type is missing from the container;
    prompting a user to supply the identified item; and
    upon receiving one or more of the items of metadata from the user, marking the container at a given level of completeness based on the items of metadata included in the container with the one or more of the items of metadata received, wherein the given level of completeness comprises multiple levels of completeness that are defined for the container.

14. The content management system of claim 13, wherein the items of metadata comprise digital distribution release metadata, lyrics, composer information, royalty payment information, or work for hire contract information, and wherein the operations further comprising:
    receiving the identified item from the user; and
    adding the identified item to the container.

15. The content management system of claim 14, wherein the operations further comprising:
    when all of the items of metadata specified for the content type are in the container, marking the container as complete.

16. The content management system of claim 14, further comprising:
    periodically checking the container to determine whether the identified item of metadata is in the container.

17. The content management system of claim 13, wherein the operations further comprising:
    receiving the identified item of metadata from the items of metadata; and
    adding the identified item of metadata to the container by storing the identified item of metadata in the container or storing a link to the identified item of metadata in the container.

18. The content management system of claim 13, wherein the operations further comprising:
    checking the items of metadata to confirm that a name of the creator of the content is included in the items of metadata with the identified item of metadata.

19. The content management system of claim 13, wherein the operations further comprising:
    receiving a request by a custodian of the content to share the container with an intended recipient; and
    transferring the container to the intended recipient.

20. The content management system of claim 13, wherein the operations further comprising:
    tracking access information to the container, wherein the access information comprises an identity of a person who accessed the container.

* * * * *